Figure 2A:
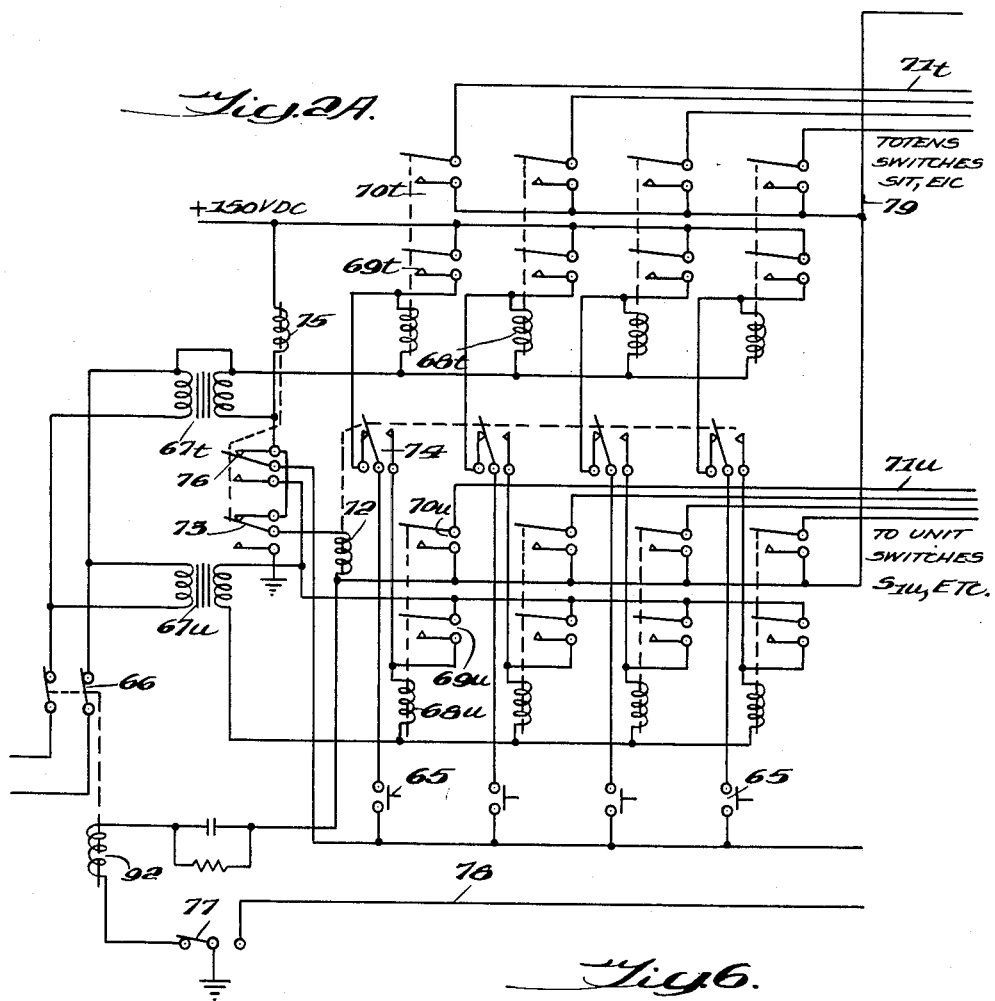

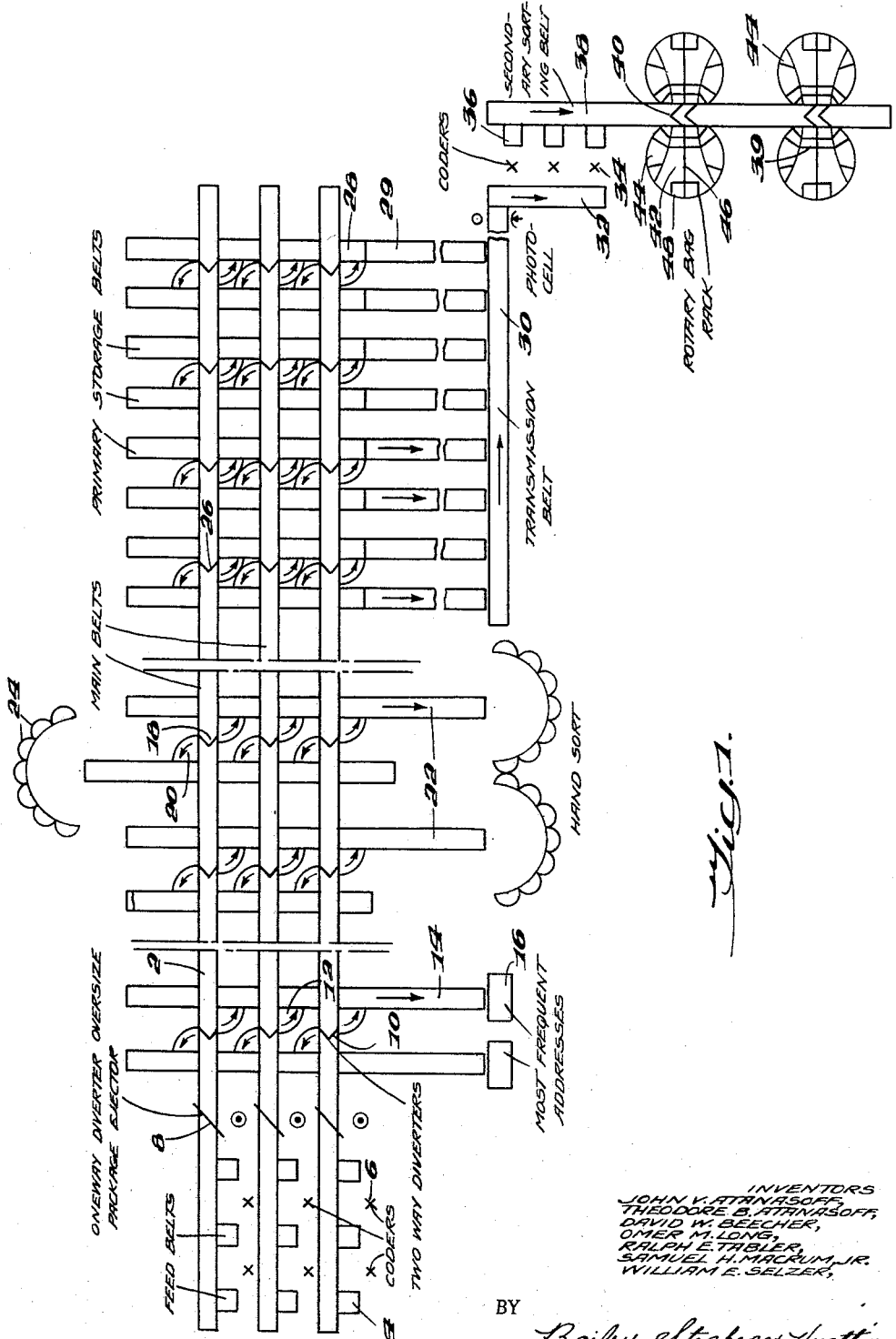

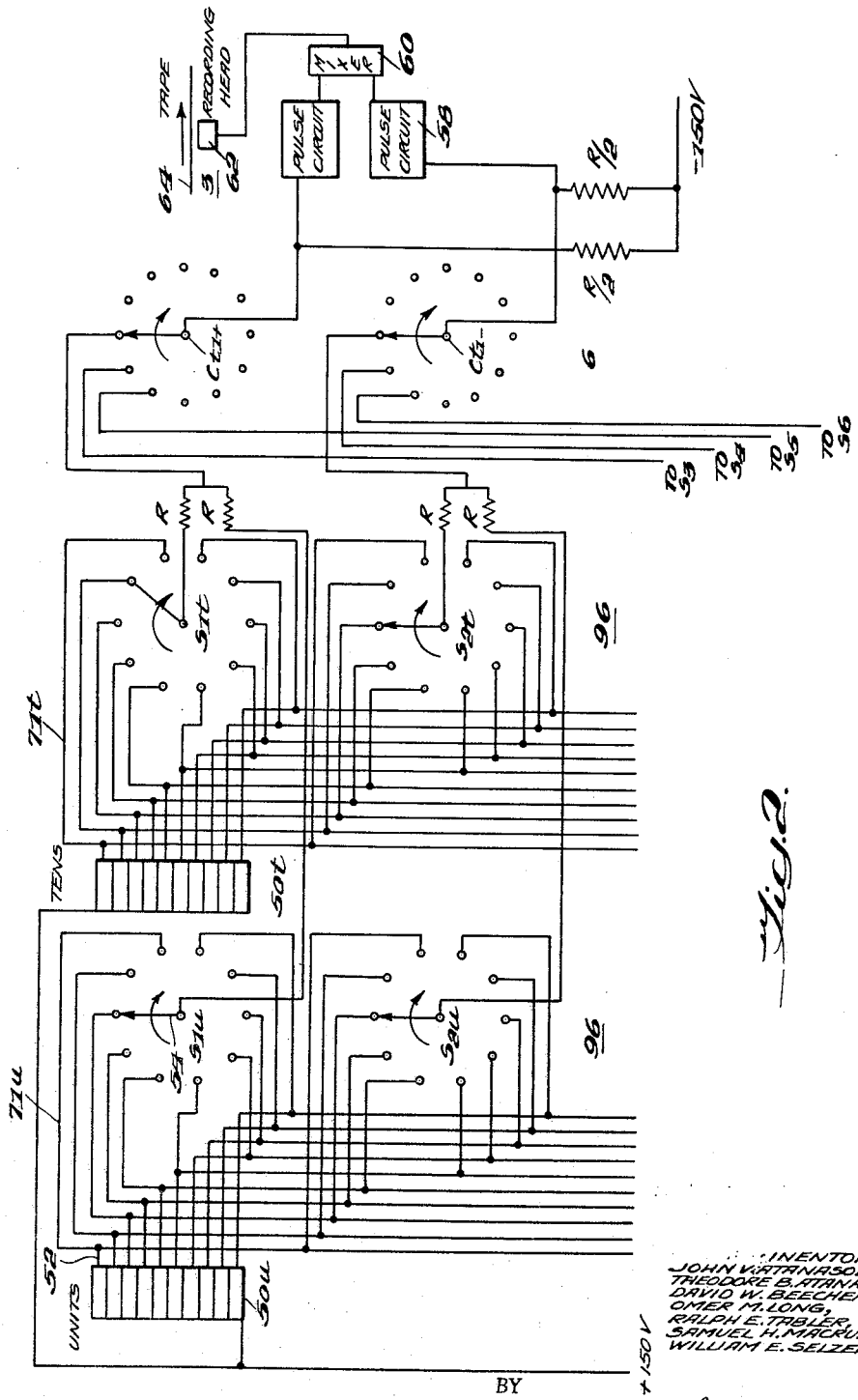

May 8, 1962     J. V. ATANASOFF ET AL     3,033,366
ARTICLE SORTING SYSTEM

Filed Jan. 25, 1960     14 Sheets-Sheet 3

INVENTORS
JOHN V. ATANASOFF,
THEODORE B. ATANASOFF,
DAVID W. BEECHER,
OMER M. LONG,
RALPH E. TABLER,
SAMUEL H. MACRUM, JR.
WILLIAM E. SELZER,

Bailey, Stephens & Huettig
ATTORNEYS

May 8, 1962 J. V. ATANASOFF ET AL 3,033,366
ARTICLE SORTING SYSTEM
Filed Jan. 25, 1960 14 Sheets-Sheet 4

INVENTORS
JOHN V. ATANASOFF,
THEODORE B. ATANASOFF,
DAVID W. BEECHER,
OMER M. LONG,
RALPH E. TABLER,
SAMUEL H. MACRUM, JR.
WILLIAM E. SELZER,

BY Bailey, Stephens & Huettig
ATTORNEYS

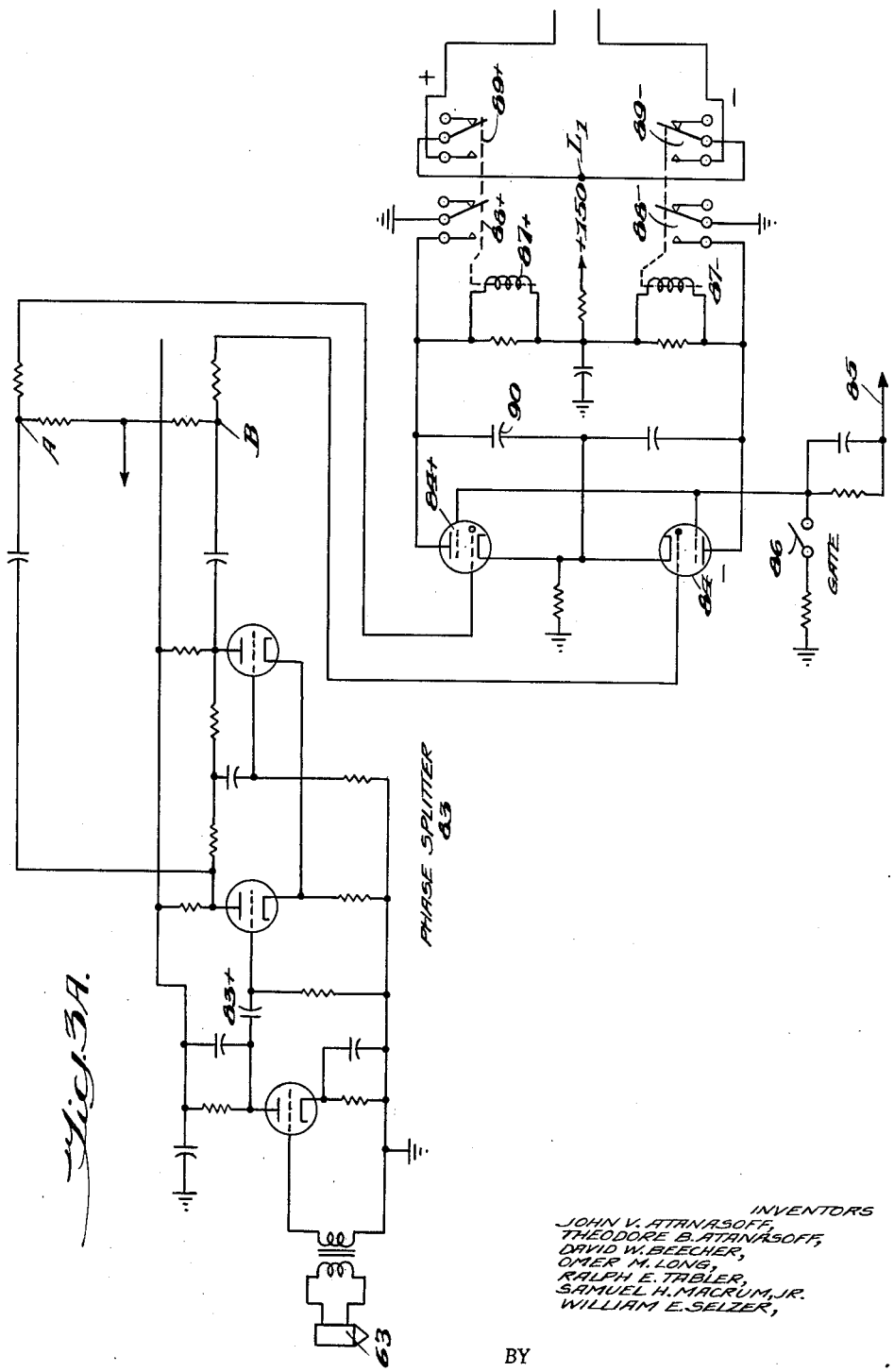

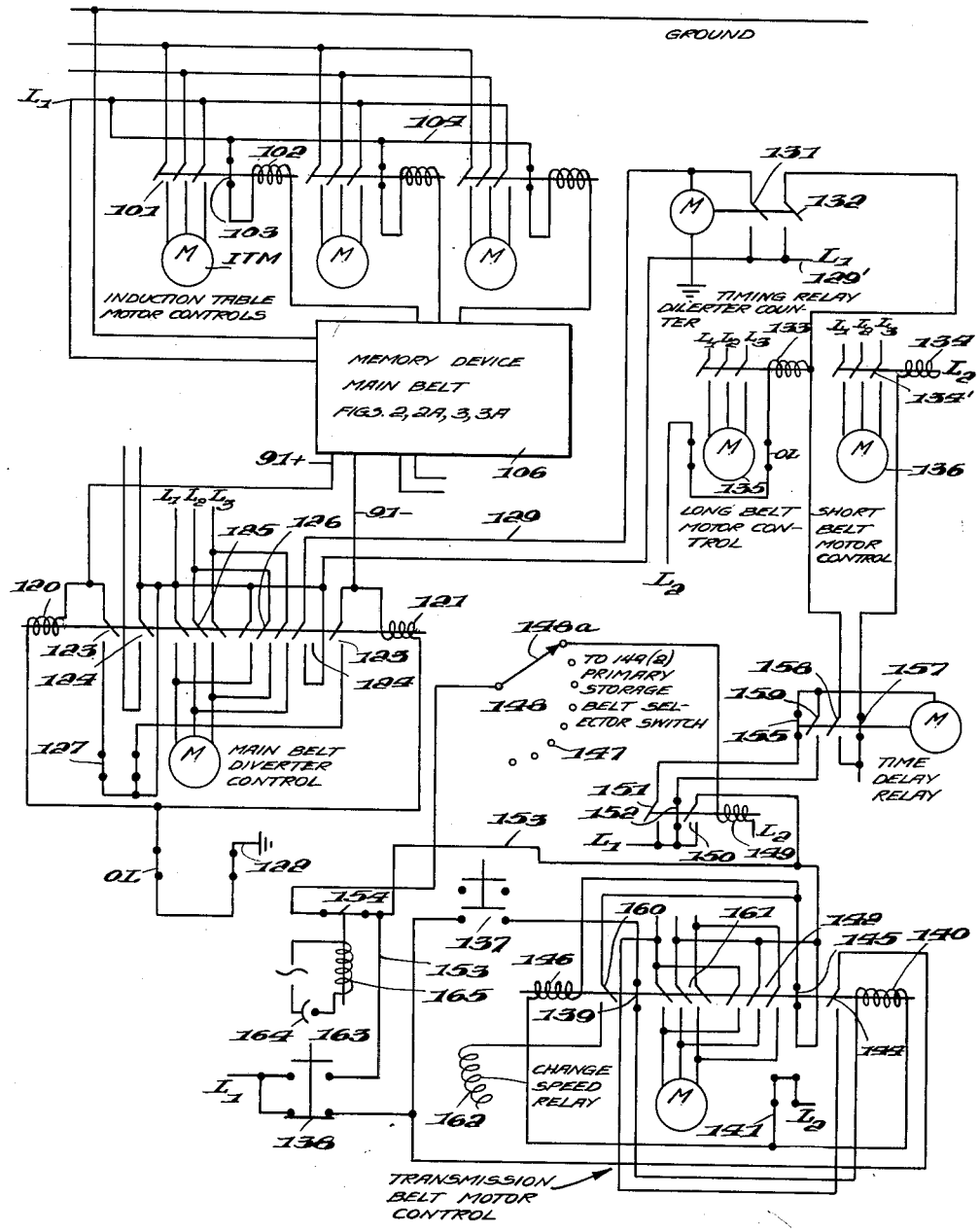

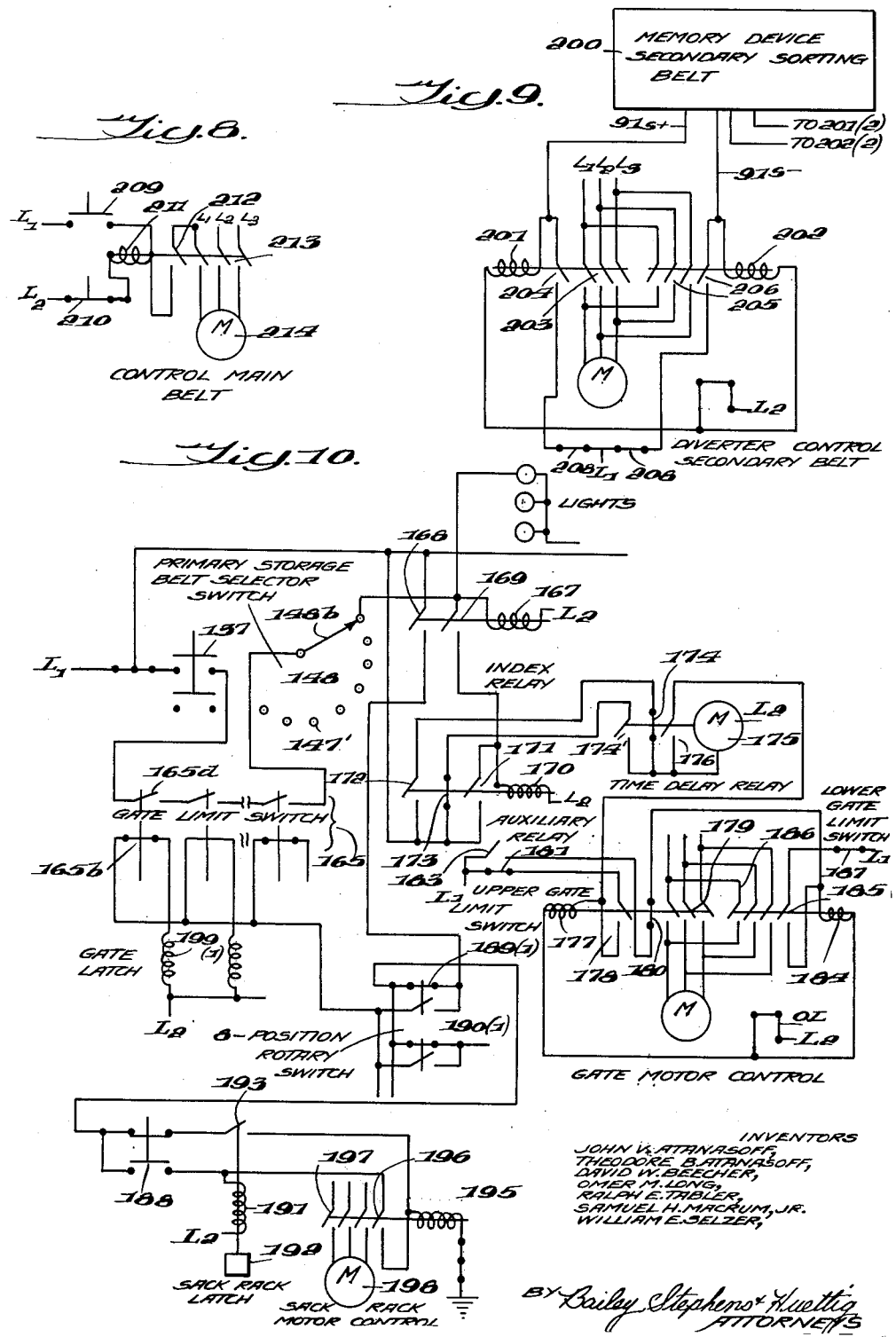

May 8, 1962   J. V. ATANASOFF ET AL   3,033,366
ARTICLE SORTING SYSTEM
Filed Jan. 25, 1960   14 Sheets-Sheet 8
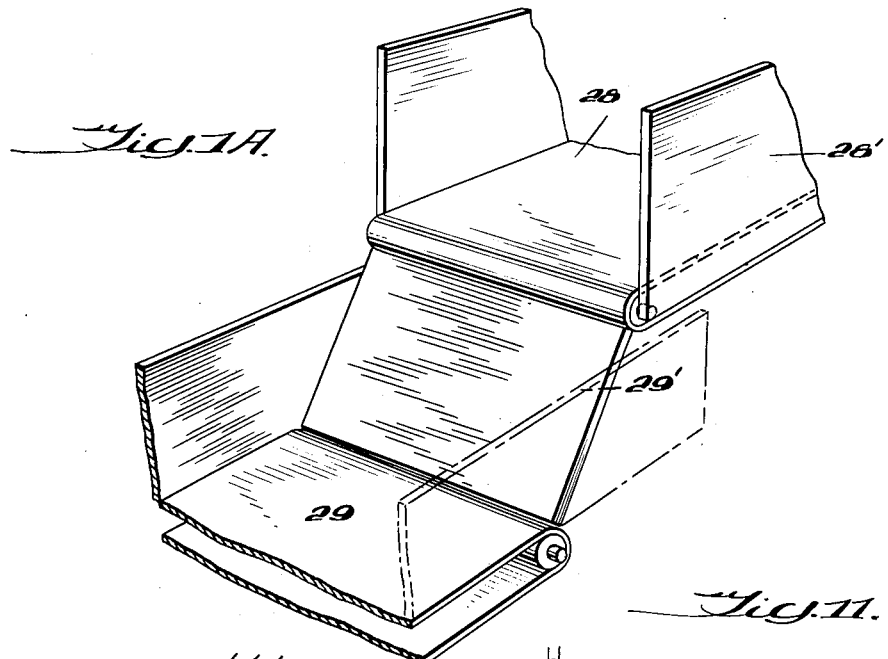
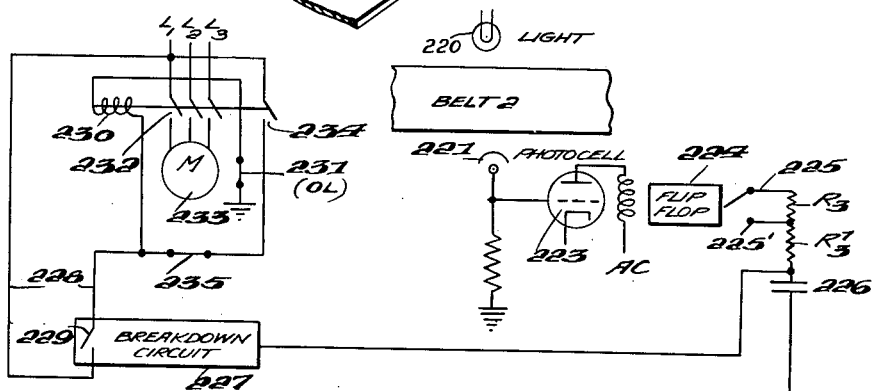
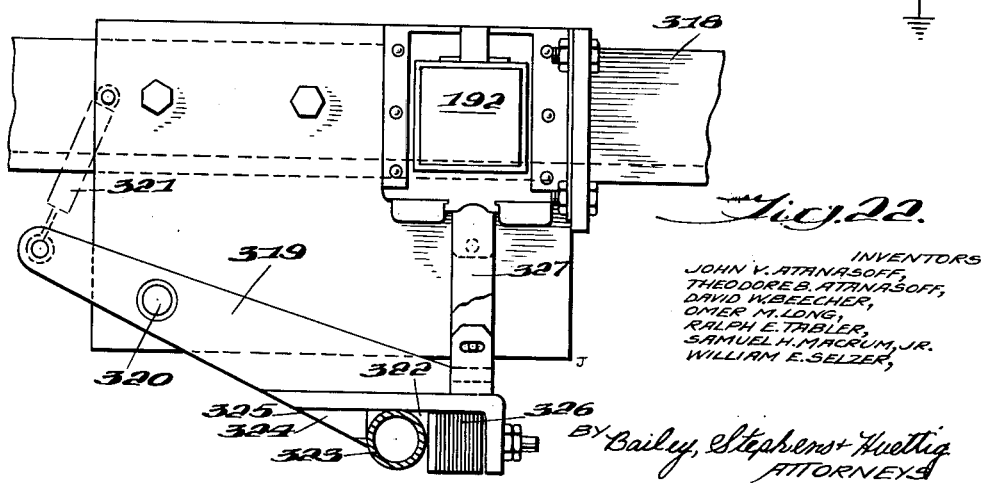
INVENTORS
JOHN V. ATANASOFF,
THEODORE B. ATANASOFF,
DAVID W. BEECHER,
OMER M. LONG,
RALPH E. TABLER,
SAMUEL H. MACRUM, JR.
WILLIAM E. SELZER,
BY Bailey, Stephens + Huettig
ATTORNEYS INVENTORS
JOHN V. ATANASOFF,
THEODORE B. ATANASOFF,
DAVID W. BEECHER,
OMER M. LONG,
RALPH E. TABLER,
SAMUEL H. MACKUM, JR.
WILLIAM E. SELZER, BY Bailey, Stephens & Huettig
ATTORNEYS

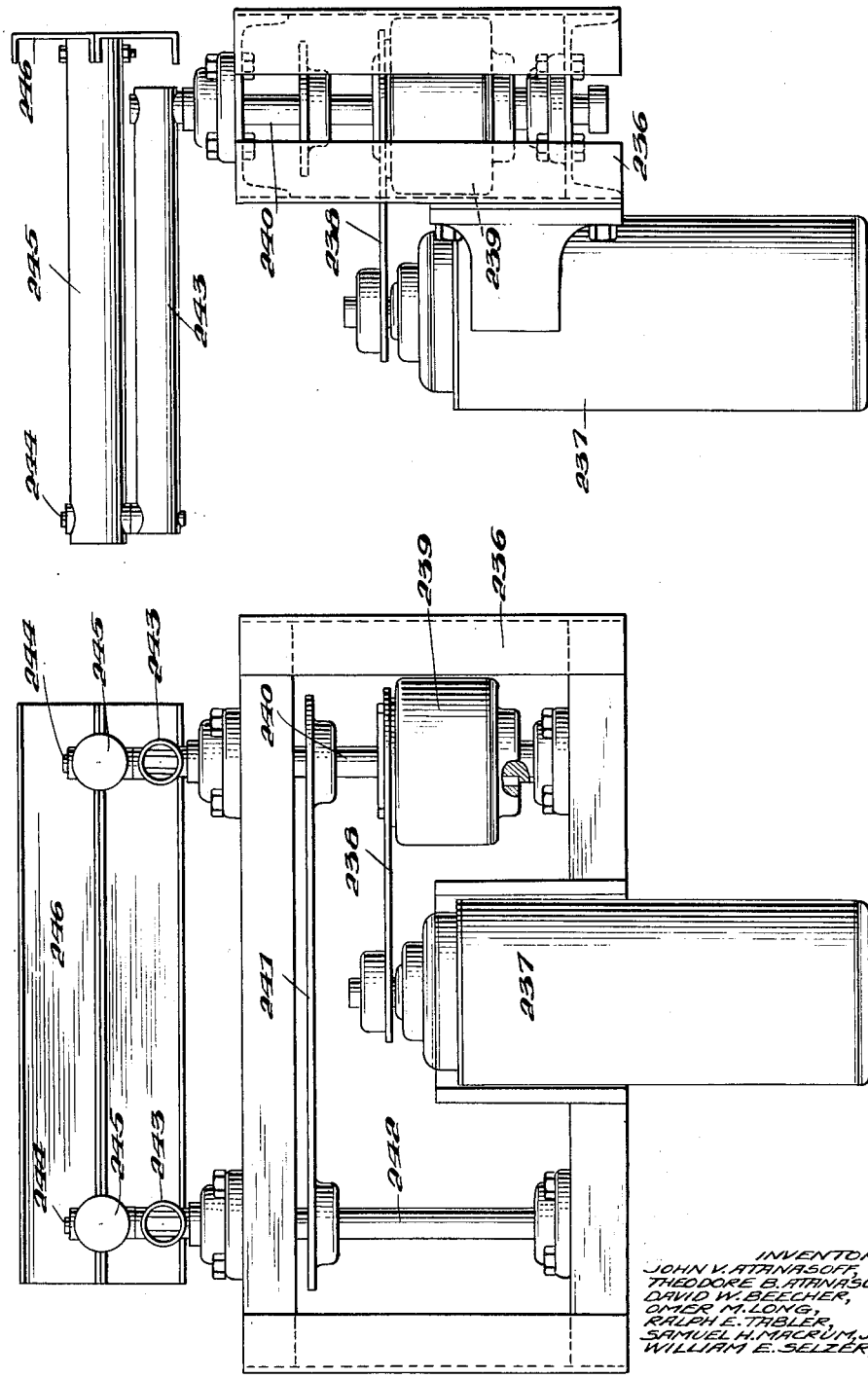

May 8, 1962 J. V. ATANASOFF ET AL 3,033,366
ARTICLE SORTING SYSTEM
Filed Jan. 25, 1960 14 Sheets-Sheet 11
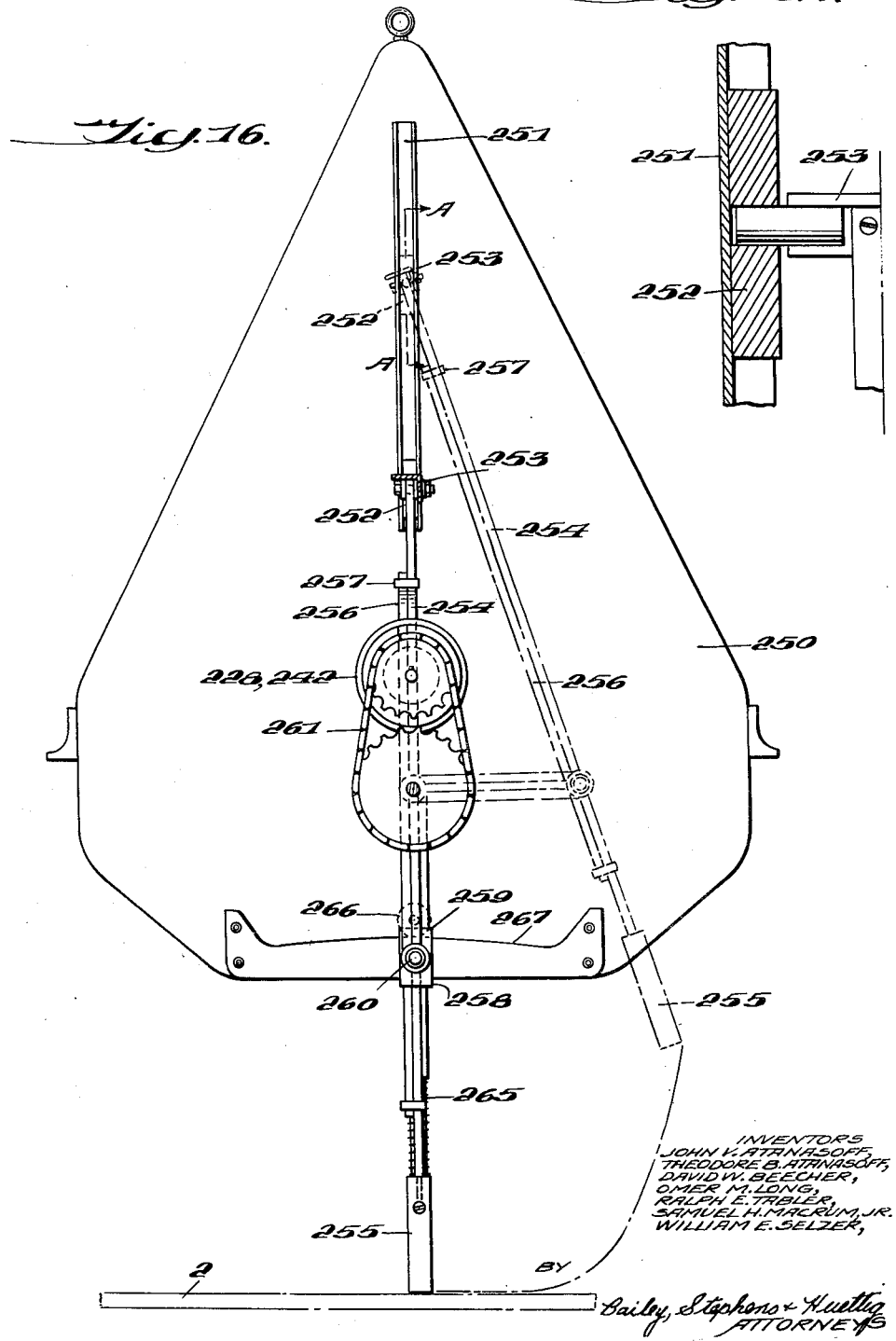
INVENTORS
JOHN V. ATANASOFF,
THEODORE B. ATANASOFF,
DAVID W. BEECHER,
OMER M. LONG,
RALPH E. TABLER,
SAMUEL H. MACRUM, JR.
WILLIAM E. SELZER,
BY
Bailey, Stephens & Huettig
ATTORNEYS

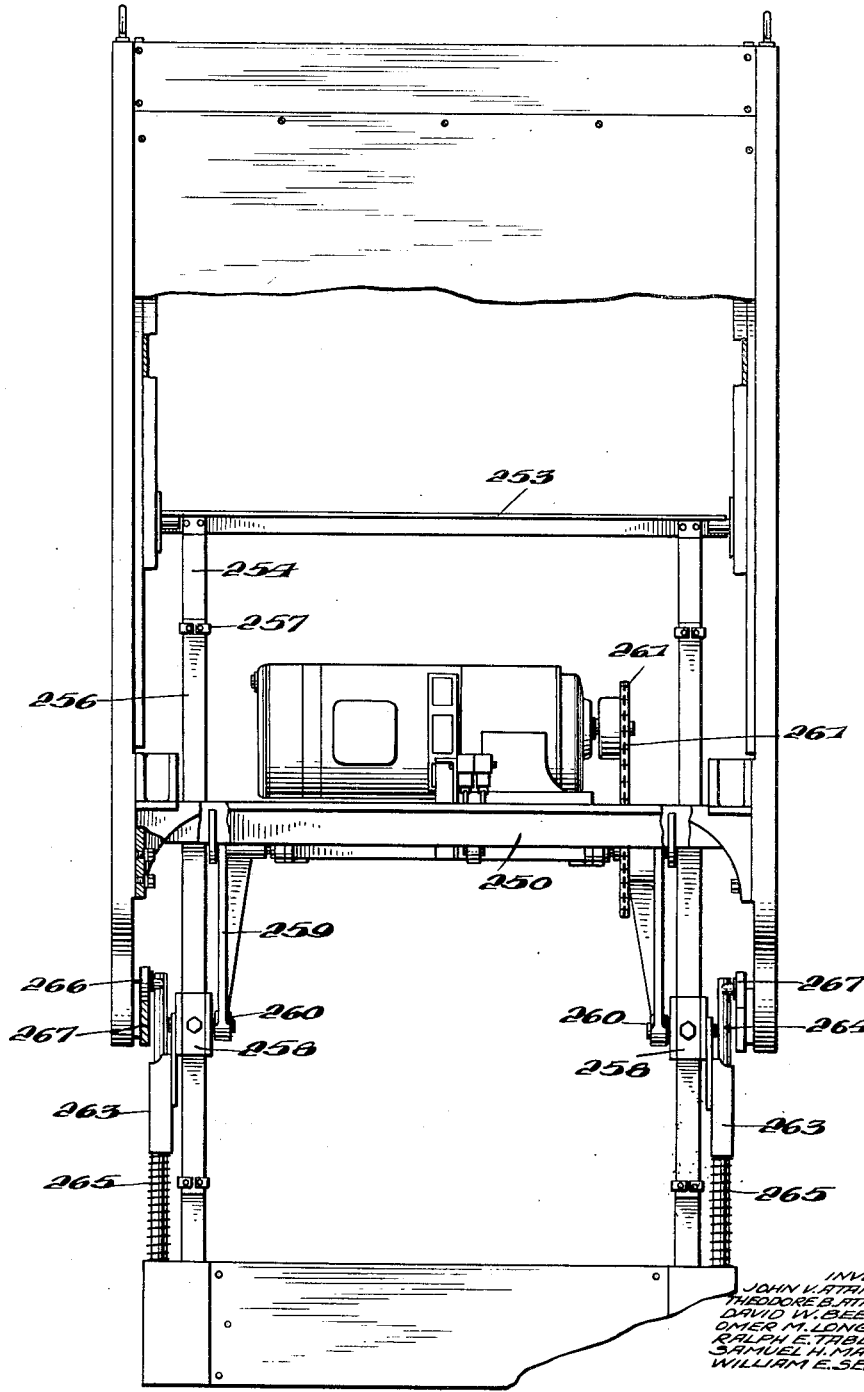

May 8, 1962 J. V. ATANASOFF ET AL 3,033,366
ARTICLE SORTING SYSTEM
Filed Jan. 25, 1960 14 Sheets-Sheet 13
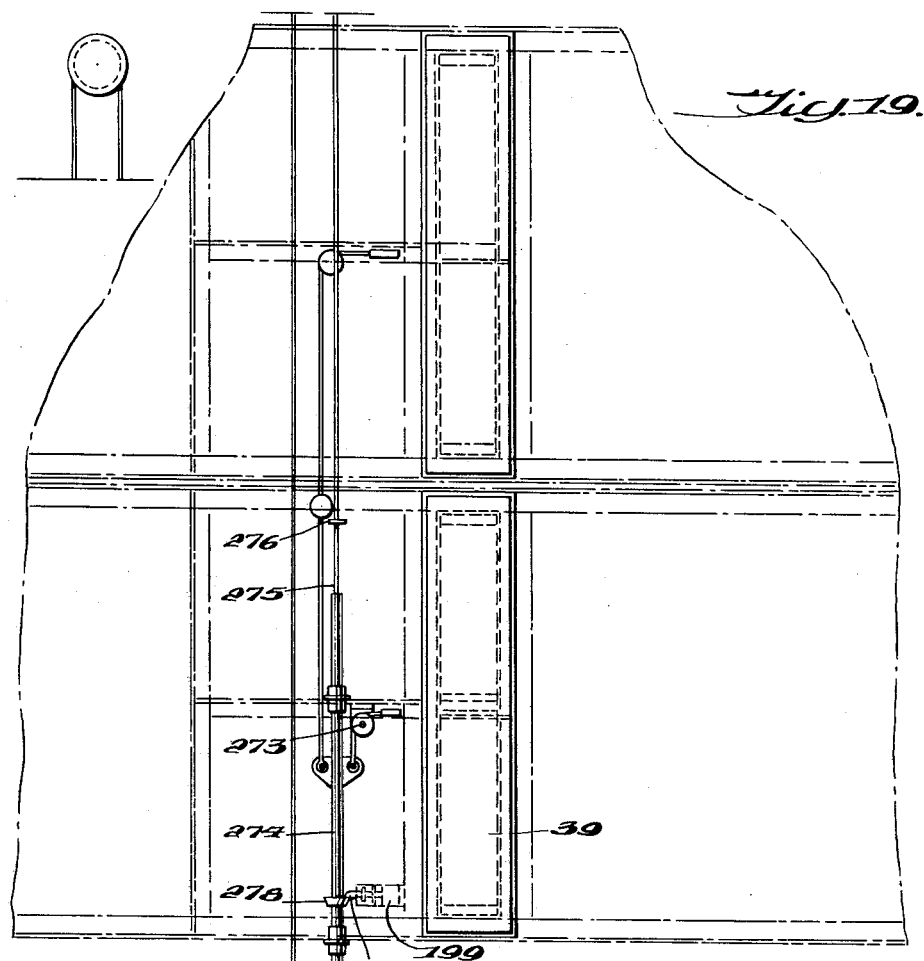
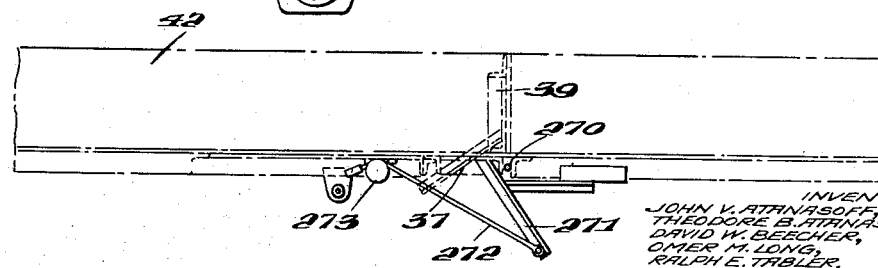
INVENTORS
JOHN V. ATANASOFF,
THEODORE B. ATANASOFF,
DAVID W. BEECHER,
OMER M. LONG,
RALPH E. TABLER,
SAMUEL H. MACKRUM, JR.
WILLIAM E. SELZER,
BY Bailey, Stephens & Huettig
ATTORNEYS

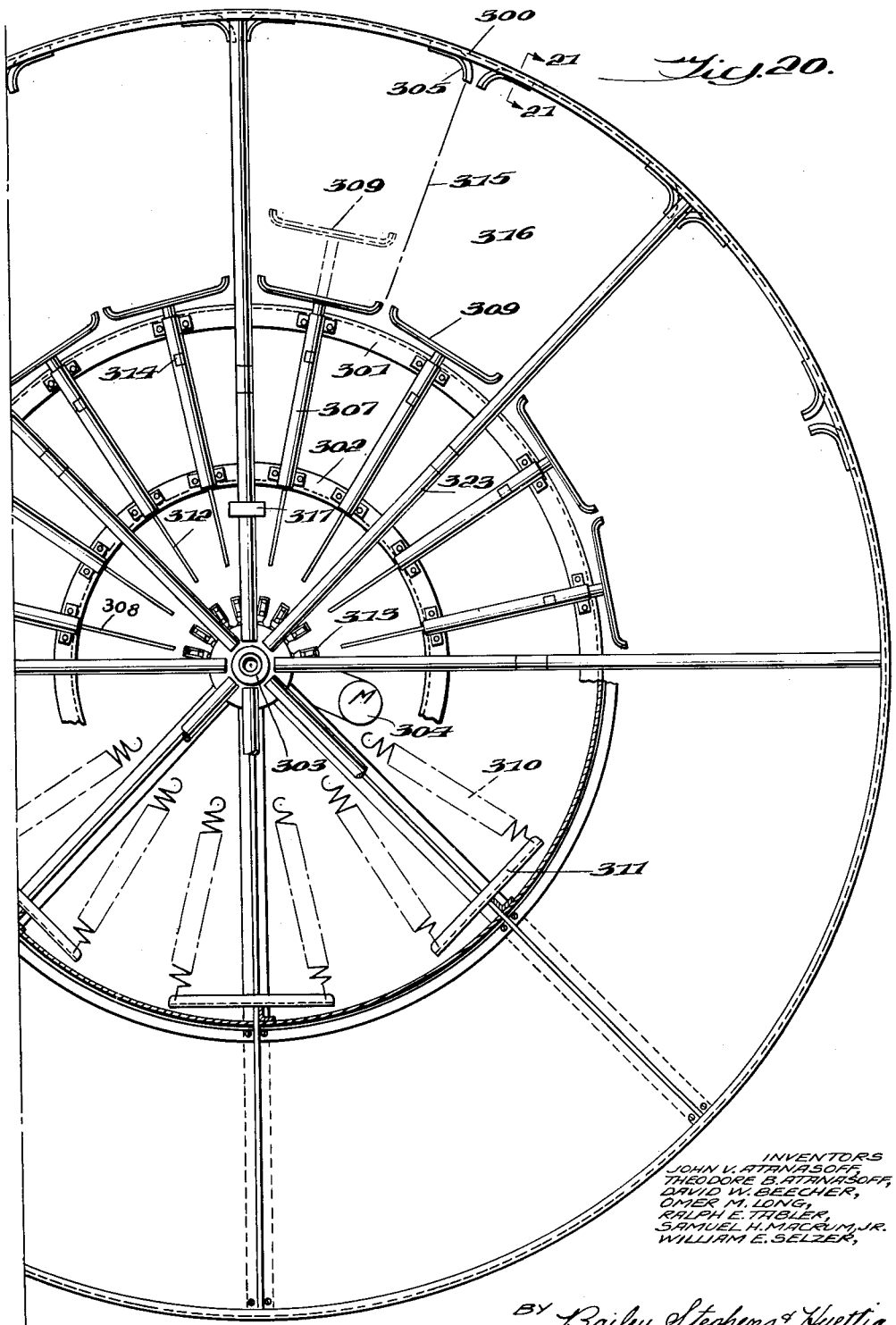

United States Patent Office 3,033,366
Patented May 8, 1962

3,033,366
ARTICLE SORTING SYSTEM
John V. Atanasoff and Theodore B. Atanasoff, Frederick, David W. Beecher, Rockville, Omer M. Long, Frederick, Ralph E. Tabler, Hyattsville, Samuel H. Macrum, Jr., Adamstown, and William E. Selzer, Frederick, Md., assignors to Aerojet-General Corporation, Azusa, Calif., a corporation of Ohio
Filed Jan. 25, 1960, Ser. No. 4,322
37 Claims. (Cl. 209—82)

The invention relates to a system for assorting objects, and to certain parts thereof, and more especially to a system for assorting parcel post packages and the like.

Various systems for this purpose have been heretofore suggested. In these systems, the automatic sorting of packages or the like, a large number of which are directed to a single destination, presents no particular problem. However, there is a serious difficulty in sorting packages directed to less frequent destinations, since the equipment for this purpose will be idle much of the time and such arrangements are too expensive and uneconomical to replace hand sorting.

The primary object of the present invention is to provide a package sorting system which overcomes this disadvantage of the known systems and which allows economical sorting of packages directed to addresses of less frequent occurrence by automatic means.

More particularly, the system contemplated for this purpose includes provision for time-sharing of a single sorting mechanism between several groups of destinations, so that the mechanism is in substantially continuous use at close to full capacity.

According to the invention, packages are subjected to a preliminary sort among several different groups of destinations. The packages of each group are then stored, and the packages of one group at a time are sorted to the different destinations of that group. The same mechanism is then used to sort another group, while packages of the first group are again stored, and so on.

An object of the invention, in this connection, is to provide rotatable holding mechanism for a plurality of package receivers, such as mail bags, at each diverting station of the time-sharing sorting mechanism, so that the proper receivers for the destinations of each group can be brought into receiving position when that group is being sorted.

A further object of the invention is to provide, in connection with the diverting stations, mechanism for holding back packages of one group until all packages of a previous group have been bagged and the receiver for the new group has been brought into position.

Another object of the invention is to provide a mechanism for removing oversize packages from the system at the beginning of the sorting operation.

Yet another object of the invention is to provide a novel type of diverter for removing packages of any height, this diverter being particularly useful in conjunction with the oversize package ejector.

It is a further object of the invention to provide, especially in conjunction with such a diverter in an oversize package ejector, means for causing the diverter to operate at such a time that it is centered with respect to the package upon which it operates.

Another advantage of the horizontal diverter is that it moves, during the outer part of its movement, in the same direction as and the same average speed as the belt over which it operates, so that it does not interfere with other packages on the belt.

An additional object of the invention is to provide an overhead diverter which is capable of selectively discharging packages to either side of the conveyor.

It is also an object of the invention to provide, especially in connection with such a two-way diverter, means to guide the movement of the diverting paddle so that its lower edge moves, during the effective part of its stroke, substantially in a horizontal plane just above the surface of the conveyor.

Still another object of the invention is to provide a simple yet efficient memory system for controlling the diverters, this system being characterized by the fact that pulses are imposed on a tape travelling synchronously with the belt, these pulses being at different distances from the beginning of successive length intervals of the tape in accordance with which diverter is to be controlled. The diverters are controlled by pickup heads located at such intervals along the tape as to correspond to these differences in distance.

Further objects and advantages of the invention will appear more fully from the following description especially when taken in conjunction with the accompanying drawings, which form a part thereof.

Figure 6:
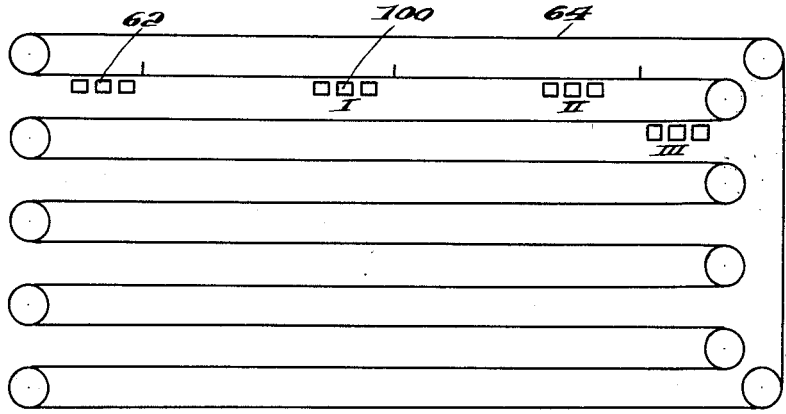
Figure 3:
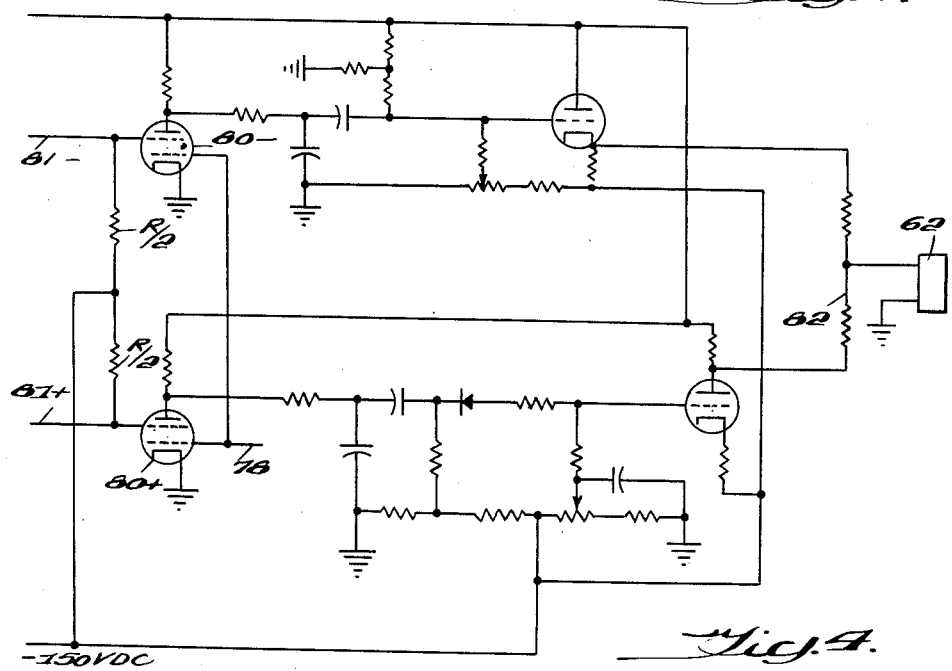
Figure 4:
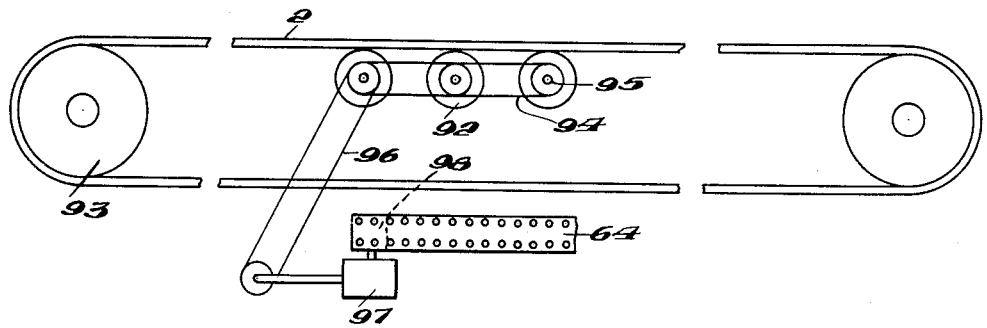
Figure 5:
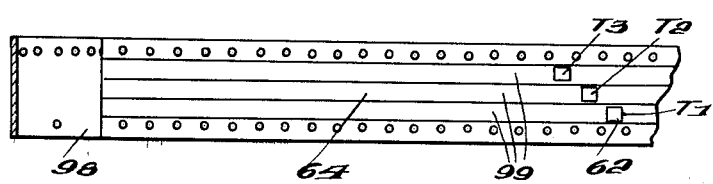
Figure 12:
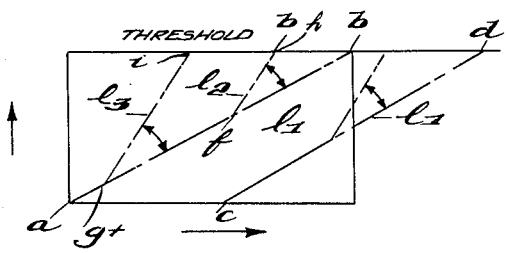
Figure 15:
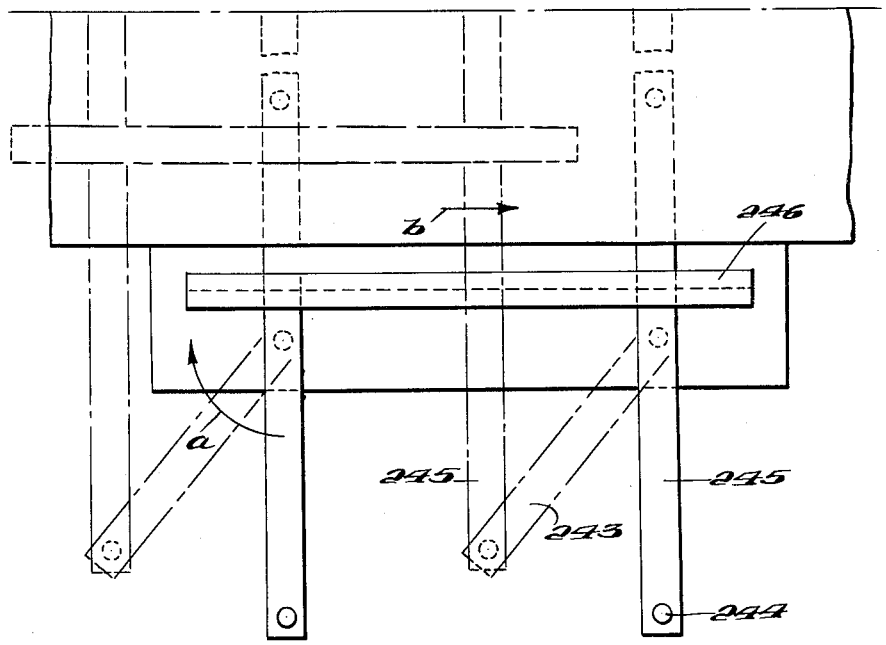
Figure 21:
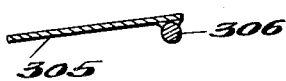

In the drawings:
FIG. 1 shows diagrammatically part of a system embodying the invention;
FIG. 1A shows a detail of the system;
FIG. 2 is a diagram of one of the memory circuits;
FIG. 2A is a diagram showing the keying circuit;
FIG. 3 is a diagram of the pulse circuits and mixer of FIG. 2;
FIG. 3 A shows the circuit of the two-way diverter control;
FIG. 4 shows the drive of the memory device tape;
FIGS. 5 and 6 show the positions of the recording and pickup heads with respect to the tape in plan view and in side elevation respectively;
FIG. 7 is a wiring diagram of the control of the primary storage and transmission belts;
FIG. 8 is a wiring diagram showing the drive of the main belt;
FIG 9 is a wiring diagram of the diverter control of the secondary sorting belt;
FIG. 10 is a wiring diagram for the gates and bag rack;
FIG. 11 is a wiring diagram for the oversize package diverter;
FIG. 12 is an explanatory diagram of the centering device;
FIG. 13 shows in end elevation the horizontal diverter;
FIG. 14 is a side view thereof;
FIG. 15 is a top plan view;
FIG. 16 shows in side elevation, with the cover removed, the two-way vertical diverter;
FIG. 16A is a cross-section on the line A—A of FIG. 16;
FIG. 17 is an end view thereof;
FIG. 18 is a vertical section through one of the chutes of the secondary sorting belt;
FIG. 19 is a bottom plan view of the gate operating mechanism;
FIG. 20 is a top plan view of the rotary bag holder;
FIG. 21 is a cross-section on the line 21—21 of FIG. 20; and
FIG. 22 shows in side elevation the latch device for the rotary bag holder.

The system in general will be described first, then the control circuit, then the details of certain of the parts.

*The System*

In general, the system shown in FIG. 1 includes one or more main belts 2, to which packages are fed by short belts 4 or induction tables operating intermittently at timed intervals (at least in the case of a plurality of coders 6) to feed packages onto the main belts. The interval of operation is the time required for the main belt to move a distance equal to the length of the number of coding stations (in this case, three) feeding packages to the belt, so that in effect a space (say four feet) is reserved on the main belt for each package.

After leaving the coding stations, the packages on the main belts pass an oversize package ejector station 8 where packages above a certain height, such as two feet, are detected by an electric eye mechanism to be described below (see FIGS. 11 to 15) and removed from the belt for individual handling.

Next, the packages reach a series of two-way diverters 10 (see FIGS. 16 and 17) which are controlled, by the coding and reading mechanism to be described below, to divert selected packages onto chutes 12 leading to cross belts 14 which feed the packages to containers 16. Here the packages directed to the eight to fifteen most frequent addresses are diverted, each onto an individual belt. For instance, one of the belts 14 may represent New York city, another Washington, D.C., another Philadelphia or the like.

The packages next pass to similar diverters 18, where the packages directed to addresses of very low frequency are diverted to chutes 20 and belts 22 by which they are carried to hand sort stations with holders for a plurality of bags 24.

Packages directed to addresses of intermediate frequency are ejected from the belt by similar two-way diverters 26 onto primary short storage belts 28. Onto each of these belts are diverted packages having a number of different destinations, which may be as high as one hundred or more for each belt. One primary short storage belt may receive packages directed to southern Pennsylvania, another western Maryland, another Delaware, another Virginia and the like. The short primary storage belts 28 are moved continuously (except, as will be described below, when the corresponding long belts are unloading). The short belts 28 feed directly onto long primary storage belts 29. These belts are normally driven intermittently under the control of the diverters 26; for example, each belt 29 may move forward a certain distance, such as six feet, whenever any of the diverters feeding packages to this belt has operated twenty times.

At intervals of time, each long primary storage belt 29 is driven continuously under the control of an operator long enough to feed all the packages which it carries onto the primary storage output or transmission belt 30, which carries the packages to a cross belt or chute 32 for the coding stations of coders 34. At this time, the corresponding short belt is stopped.

Transmission belt 30 is normally driven at a slow speed so as to feed packages to the secondary coders at the rate at which they can be handled. However, when one batch of packages has been cleared from the transmission belt, and one of the long primary storage belts is being run continuously to discharge its packages to the transmission belt, the latter is speeded up so as to receive these packages.

Coders 34 code the packages and place them on feed belts 36 which, like feed belts 4, are intermittently operated and feed each package to a space reserved for it on secondary sorting belt 38. Belt 38 carries the coded packages to two-way overhead diverters 40 which eject the packages to the proper chutes 42, there being two chute sections for each rotary bag rack 44 (see FIGS. 20 to 22).

Two chute sections for each rotary bag rack are separated by a vertical wall 46, these chutes being fed by two adjacent vertical two-way diverters 40, and a bag rack and two chutes are position on each side of the belt 38 at each station. Each chute has an opening 48 over the mouth of a bag carried by rack 44.

This part of the system operates as follows:

Assume that the packages on the first belt 28 are directed to ninety-six different destinations in Pennsylvania. These packages are fed to the belt 30 and to coders 34, and are coded by them and placed on belt 38. At this time, the gates 39, to be described below, are raised in the chutes leading to each bag rack, thus holding back all packages diverted into the chutes. When the preceding bags are loaded and the lower parts of the chutes cleared, the bagging operator pushes a button which causes the gates in those particular chutes to drop, so that all packages for two particular destinations, such as York and Harrisburg, will slide down the chutes, as well as any succeeding packages from the first belt 38. Before this happens, however, the bag rack is indexed until the York and Harrisburg bags are positioned under the openings 48 in the proper chutes.

When belt 30 is cleared of the Pennsylvania packages, and these have been distributed by belt 38, another of belts 29 is selected, and caused to feed its packages to the coders 34. This operation raises all the gates in the chutes, so that the bagging operator can continue to bag the packages from the previous sort. When he has completed this bagging, he pushes the control button and the bag rack indexes to the proper position for the new sort, the gates on that particular bag rack drop, and the new sort is bagged.

Thus the sorting section composed of the belt 38 and rotary bag racks 40, by a time-sharing operation, is in substantially constant use at almost full capacity.

Obviously, the number of such sorting sections can be varied, as well as the number of storage belts for each sorting section. However, in general the number of primary storage belts is half the number of bags held by each rotary rack, since the racks hold two different bags for each primary storage belt. Likewise, the various sorting sections, such as the most frequent addresses belts, hand sort belts and primary storage belts can be arranged in any desired order with respect to the main belts, since the coded packages can be removed at any desired place along the line. The number of each set of belts can also vary.

Actually, as shown in FIG. 1A, short belts 28 and long belts 29 both run between walls 28', so that packages can pile up on them to considerable heights. A chute 29' transfers packages from belt 28 to belt 29.

Coding System of Diverter Control-Memory System

In general, the coding system, both for the main belts 2 and for the belts 38, comprises a magnetic tape operated in synchronism with the belt, receiving code charges thereon when the coder presses the proper key and operating to discharge the package from the belt when the tape reaches a reading head which is responsive to the signal imposed on the tape.

For the control of the diverters, a pulse-position code is preferably used. This means that the diverter control unit receives two pulses, one from the signal which appears on the tape and the other at predetermined intervals. The pulse signals imposed on the tape are positioned at different points along the length of the unit interval or length of tape corresponding to each packages space on the belt, the space being determined by the particular code number punched by the coder. The reading heads controlling the different diverters are spaced along the tape by different distances from the points passed by the beginning of each interval of the tape past a given point, and the corresponding diverter control units are responsive to the coincidence between a pulse signal fed to all the diverter control circuits and the receipt of a signal from the tape by the diverter head.

Likewise, especially with the two-way diverters to be described below, it is preferable to use both positive and negative code pulses, each of these controlling the diverter to operate to one side or the other. This arrangement requires only a single reading head for each diverter.

The coding system for imposing either positive or negative control signals or code pulses at the proper positions along the tape is shown in FIG. 2.

The coding system here shown is to control forty-eight two-way diverters with ninety-six chutes fed thereby. Each length of tape, corresponding to forty-eight inches of the belt, is four inches long, and is designed to receive code pulses, either positive or negative, at sixteen different positions along its length. Three separate tracks are used running parallel to each other on the tape, so that ninety-six different pulses can be stored on each four-inch length. Three recording heads, one for each track, are used for each coding station.

In FIG. 2, $50_u$ represents the key punch unit for units, and $50_t$ the key punch unit for tens. These are supplied with 150 v., and when any key is punched it supplies such voltage to the corresponding output line 52.

Switches $S1_u$, $S1_t$, $S2_u$, $S2_t$, etc. are provided for permitting the diverters controlled by any given code signal to be changed without changing the code, which must be memorized by the coders. For this purpose, there are 96 $S_u$ switches and 96 $S_t$ switches. Each output line of the unit key punch unit $50_u$ is connected to one of the ten contacts of each of the 96 switches $S_u$ and each output line of the tens keypunch unit $50_t$ is connected to one of the contacts of each of the 96 switches $S_t$. The movable contacts 54 of the switches $S_u$ and $S_t$ can then be set so as to connect any desired combination of numbers to any of the contacts of commutators $C1_{t+}$, $C1_{t-}$, and so on.

Movable contacts 54 of the switches $S1_u$, $S1_t$ are each connected through resistance R to a movable contact of one of the commutators, such as contact $C_{t1+}$. The movable contacts of switches $S_{2u}$, $S_{2t}$ are each similarly connected to another commutator contact, such as a contact of commutator $C_{t1-}$ (commutator recording negative code pulses on track 1). Similarly, each pair of switches $S_u$, $S_t$ is connected to a different contact of one of the $C_t$ commutators.

Commutators $C_{t1+}$ and $C_{t1-}$ have their movable contacts 56, which are driven in synchronism with the movement of the tape, connected with 150 v.—through resistors R/2 of half the value of resistors R. Each is connected to a pulse circuit 58, and these two pulse circuits are connected to a mixer 60 which feeds the recording head 62 located adjacent track 1 of the tape 64. Similarly, the movable contacts of commutators $C_{t2+}$, $C_{t2-}$ and $C_{t3+}$, $C_{t3-}$ are connected each to a pulse circuit, and each pair of these pulse circuits to a mixer, the two mixers feeding recording heads opposite tracks 2 and 3 respectively.

In order to allow for positioning of the recording heads in proper relation, it may be desirable to space the three recording heads along the tape path, in which case the four-inch lengths of tape corresponding to each recording head will not coincide transversely of the tape. However, by spacing the reading heads similarly, proper reading of the tape is possible.

In this arrangement, when the 150+ voltage is connected to some terminal of a commutator, the voltage imposed on the pulse circuit drops to zero, since the two resistances R in parallel balance the resistance R/2, and a thyratron in the pulse circuit is allowed to fire and cause a pulse signal to be recorded on the tape. The mixers determine, in accordance with which of commutators $C_{t1+}$ or $C_{t1-}$ is fired, whether the pulse recorded is positive or negative.

FIG. 2A shows a form of keyboard circuit which accomplishes the function of the keyboards $50_u$, $50_t$. Actually, only one set of buttons 65 is used. Current is supplied from a suitable source through switch 66 to two transformers $67_u$, $67_t$. Assuming the various parts to be in the position shown, transfer relay 72 which is grounded through switch 77 will shift switches 74 to the left to connect them with the tens relays $68_t$. Now, closing of push button $65_1$ will close a circuit from the upper transformer $67_t$ through switch 76, transfer switch 74 and relay coil $68_t$, which will close switches $69_t$, $70_t$. Switch $69_t$ is a holding relay switch to maintain a current through relay coil $68_t$ even after the push button is released. Switch $70_t$, on the other hand, connects one of lines 71 which lead to switch $S_{1t}$, through transfer relay coil 72 and switch 73 to transformer $67_t$.

As soon as the push button is released, relay coil 75, which controls switches 73, 76 is energized, having up to that time been shorted by the push button, and switches over switches 73, 76, to connect in transformer $67_u$ and to disconnect transfer relay coil 72, allowing switches 74 to shift to the right hand positions, connecting in relay coils $68_u$. The previously selected relay $68_t$, however, remains energized, keeping the corresponding switch $70_t$ closed.

Closing of the push button now energizes one of relays $68_u$, closing switches $69_u$ and $70_u$, and locking the selected unit switch in closed position.

The commutators $C_{1t+}$, etc. of FIG. 2 rotate once a second, in synchronism with the tape, while the cycle of the recording system is two seconds for keying the code to the switches $70_t$, $70_u$ and one second to write. For one second out of every three, then, a rotating switch 77, connected suitably with the tape driving mechanism will ground line 78 which, with the terminal line 79 of switches $70_t$, $70_u$, extends to the circuit shown in FIG. 3.

Once in each cycle, switch 77 is closed to connect relay coil 92 to ground, which opens switch 66 and permits locking relay switches $69_t$, $69_u$ to be deenergized and the whole circuit to be reset to starting position.

FIG. 3 shows the pulse circuit 58 and resistances R/2 of FIG. 2, connected to commutator output lines 81+, 81— of FIG. 2, fed by +150 v. This voltage is imposed on respective grids of thyratrons 80+, 80—. Other grids of the thyratrons are connected to line 78. When these latter grids, which may be called control grids, are grounded during the write cycle, when switch 77 is closed, and when one of lines 81+, 81— is energized, it reduces the charge of the control grid on the corresponding thyratron to zero and allows the thyratron to discharge. This causes the thyratron to become conductive, which correspondingly causes a voltage to be applied to the control electrodes of respective amplifier tubes. Through the remainder of the circuit, including the resistive mixer 82, this imposes either a positive or a negative signal on the recording head 62.

FIG. 3A shows one of the pickup heads 63 feeding the overhead diverter control circuit. Accordingly as the input signal is positive or negative, this circuit will give a positive signal at A and a negative signal at B, or vice versa, of phase splitter 83. In the first case, tube 84+, in the second 84— will be rendered conducting, by having their control grid potentials driven to zero. However, this cannot happen unless simultaneously the —150 v. imposed at 85 is removed from the grids by the closing of switch 86, which is driven in synchronism with the tape and is closed at the beginning of each tape interval to furnish the gate pulse referred to above. If reduction of the grid potential imposed on either of tubes 84+, 84— by the phase splitter coincides with the gate pulse, relay coil 87+, 87— will be energized, and will close switches 88+, 89+ or 88—, 89—. Switches 88+, 88— serve to discharge condensers 90, while switches 89+, 89— connect the $L_1$ line to lines 91+, 91— (see FIG. 11).

There is, of course, such a circuit for each two-way diverter.

*Memory Device*

The tape 64 (FIGS. 4 to 6) is driven in synchronism with the belt by three rollers 92 located below the upper run of the belt and in engagement with it. This has the advantage of following more exactly the speed of the belt than by driving from one of the idler rollers 93, since the effective radius of the belt, which is half-way through its thickness, may vary with changes in tension so as to introduce errors into the tape drive. The rollers 92 are connected by a chain 94 running over sprockets 95, and in turn by chain 96 driven by a motor 97, as by a selsyn system. Motor 97 drives the drive sprocket 98 of the tape 64.

In a system such as described, the tape is to carry three parallel tracks 99. The recording heads 62 are for convenience, as shown in FIG. 6, spaced along the tape. Likewise the pickup heads 63 of each group are spaced along the tape by the same distances as the recording heads.

However, the groups of pickup heads 63 are spaced apart by amounts progressively slightly greater than the lengths of the tape intervals. For example, as shown in FIG. 5, when the beginning of a tape interval is opposite the first recording head 62, the first pickup head of group I is slightly behind the beginning of the interval opposite it, group II slightly further behind, and so on. This means that the beginning of the tape interval will pass the successive pickup heads at progressively earlier moments during each interval of time required for a single tape interval to pass the recording heads.

There is also imposed on the diverter control circuits, once in each time interval, as for instance at the beginning of each time interval, a gate pulse. Now the keying decides, by the commutators of FIG. 2, how far along the length of the tape interval, the code-distance signal is imposed. Thus, if the code impulse is imposed on one of the tracks three-sixteenths along the length of the tape interval, it will be opposite the corresponding pickup head of group III when the gate pulse occurs. Since the diverter control circuit, described above, responds to a coincidence of these two signals, the third diverter will be actuated.

Control Circuit

FIGS. 7 to 10 show the control circuit. Current is supplied by three phases $L_1$, $L_2$ and $L_3$ of a three phase circuit.

The three induction table motors 1TM for the feed belts 4 are connected (see FIG. 7) to the three-phase line by normally open switches 101 controlled by relay 102. Coils 102 are connected by normally closed switches 103 to line 104 connected to the $L_1$ phase. The other ends are connected by lines 105 to the main belt memory device 106 shown in FIGS. 2, 2A, 3, 3A. Assuming a main belt 2 operating at 4 feet a second, and assuming that a space of four feet is allowed for each package, then the circuit is designed so as to operate each of the feed belts as three-second intervals to feed a package to the main belt. For this purpose, the lines 105 are fed once each three seconds by the rotating switches connected with the tape feed mechanism energizing relays 102 to close switches 101 and connect the motors 100 temporarily to the three phase circuit. However, this action also opens switches 103, so that coils 102 are deenergized and the circuit to the motors is broken after they have run a short distance.

Three lines 105 are shown since, in some installations, it may not be possible to space the feed belts exactly four feet apart, in which case the three belts must be operated at different times, in the three second cycle, each being controlled by a different rotary switch.

Memory device 106 also feeds signals to the main belt diverter controls by line 91+ (positive) and line 91— (negative). These lines feed relay coils 120, 121 whose other ends are grounded at 122. The relay coils when energized close switches 123, 124, and 125, 126 (three each of 125 and 126). Switches 123 when closed connect coils 120 or 121 to line $L_1$, and thus act as holding relays to maintain the coils energized. There are microswitches 127 in the connections from switches 123 to the $L_1$ line which are opened at the end of each cycle of operation of the diverter to deenergize coils 120, 121, so as to stop the operation. Switches 125, 126 connect the motor 128 to the three phase circuit, but connect the $L_2$ and $L_3$ lines to different terminals of the motor to cause it to turn in opposite directions, so as to divert packages to one side or the other of the main belt 2.

There is such a control circuit for each diverter, being energized only when a positive or a negative signal is received from the lines 91+, 91— of FIG. 3A.

The switches 124 feed the timing relays and diverter counter of two different primary storage belts, there being such switches for each diverter that feeds to primary storage belts. Closure of switch 124 closes a circuit from line 129' ($L_1$), ($L_3$) through line 129 to motor 130. The operation of the two-way diverter requires about 0.8 second, so that at each operation the switch 124 is closed for this length of time and drives motor 130. Motor 130 is connected to rotary switches 131, 132 in such a way that, after about 16 seconds, or after 20 operations of the diverter, it closes switches 131 and 132. Closing of switch 131 connects motor 130 directly to line 129', so that it runs continuously until it turns far enough to reopen switch 131, a period of five seconds. Switch 132 remains closed for four seconds.

Closing of switch 132 connects relay coil 133 to line $L_1$ and closes a circuit through the coil 133 to $L_2$. This causes the motor 135, to operate for four seconds, so as to move the accumulation of packages along on the long belt a predetermined distance, and thus to make room for more packages diverted from the main belts and fed to the long belt by the short belt. This continues until the time comes to discharge one of the primary storage belts.

During this period, relay coil 134 is continuously energized from $L_1$ through normally closed switch 157 to $L_2$, closing switches 134' to motor 136.

During normal operation, the transmission belt 30 is running continuously at low speed to deliver packages to the secondary sorters. The inception of this movement is produced by closing push button 137, which connects line $L_1$ through the lower contacts of push button switch 138 across normally closed switch 139 to coil 140, and closes a circuit through this coil to line 141 ($L_2$). This closes the three switches 142, connecting motor 143 to the line and driving the transmission belt at low speed. This likewise closes switch 144 which connects coil 140 through push button 138 to $L_1$, thus locking in this coil so that the motor continues to run. At the same time, switch 145 is opened so as to prevent energization of coil 146.

Assuming the transmission belt to be cleared of packages and ready to receive those of the next group, the supervisor selects one of the primary storage belts for discharge by selecting one of the contacts 147 of selector switch 148. Then he pushes push button 138, which breaks the circuit from line $L_1$ through switch 144 to coil 140, deenergizing this coil so that switches 142 and 144 open, and the motor is no longer driven through switches 142.

However, the upper contacts of switch 138 connect line $L_1$ through the coil 149 of a relay having normally open switches 150, 151 and a normally closed switch 152 to line $L_2$. Switch 150 closes a circuit from $L_1$ through line 153, switch 154, selector switch 148 and coil 149 to $L_2$, and thus locks in coil 149.

Switch 151, when closed, through normally closed switch 155 of a time delay relay starts motor 156 into operation. Operation of the motor closes switch 158, connecting $L_3$ through coil 133 to $L_2$ and energizing motor 135. Switch 155 remains closed for seventy seconds, and switch 158 for sixty seconds, which is long enough to move the long primary storage belt the full length of its run, so as to discharge all the packages from it onto the transmission belt 30. Five seconds after the motor 156 begins to operate, normally closed switch 157 opens, and stops the short belt motor 136. After seventy seconds, switch 155 opens and switch 159 closes. This stops motor 156.

Closing of the upper contacts of switch 138 likewise closes a circuit from $L_1$ through line 153, normally closed switch 145 and coil 146 to line 141 ($L_2$). This closes switches 160, 161 (three of the latter) and energizes the transmission belt motor 143. Closing of the switch 160 energizes coil 162 which operates a speed change mechanism connected with motor 143 so that the transmission belt moves at a higher speed, great enough to receive packages at the rate they are discharged by the secondary sorting belt.

Release of push button switch 138 does not stop the motor 143, because a circuit remains, through closing of switch 150, from $L_1$ through this switch to line 153, switch 145 and coil 146 to line 141 ($L_2$). Coil 162 also remains energized by closing of switch 160.

When the front ones of the piled up packages on the transmission belt reach a point near the secondary coders, they break the light between a light source 163 and a photocell 164. This produces energization of relay coil 165, which opens switch 154, deenergizing coil 149 and allowing switch 150 to open. This stops the motor 143, by deenergizing coil 146, and the transmission belt remains stationary until it is started at low speed by push button 137.

At the same time, switch 152 closes and through switch 159 connects $L_1$ through motor 156 to $L_2$. This operates the motor for a second or so, just far enough to close switches 155 and 157 and open switch 159 (switch 158 having already been reopened) so that the time delay relay is set for another operation.

Referring now to FIG. 10, the selector switch 148 has a second bank of contacts 147', corresponding to contacts 147, and a second slider 148b connected to slider 148a for movement therewith. Each gate 39 has an upper gate limit switch device composed of double-pole microswitches 165, thus in effect constituting two switches 165a, 165b, one of which is open when the other is closed. Switches 165a are connected in series, so that the circuit through them is closed only when all the switches are closed, which takes place when the gates are down.

Assuming the gates to be down, closing of the upper contacts of switch 137 closes a circuit from line $L_1$ through the selected contact 147' to coil 167 of an index relay 1 and at the same time light a light 166. This closes switches 168 and 169. Switch 169 closes a circuit through coil 170 of an auxiliary relay to $L_2$. This closes switches 171 and 172 and opens normally closed switch 173. Closing of switch 171 completes a circuit from line $L_1$ through switch 171 and coil 170 to $L_2$, thus locking in coil 170; and also a circuit through switch 169 and coil 167 to $L_2$, thus locking in coil 167.

Closing of switch 172 completes a circuit from $L_1$ through switch 172, normally closed switch 174 and motor 175 of a time delay relay to $L_2$, thus starting the motor in operation. Motor 175 runs for forty-five seconds, which is the time required for the secondary sorting belt to move the full length of its run, so that all packages of the previous sort have been removed from it. Motor 175 then closes switch 176, which closes a circuit from $L_1$ through switches 172, 174 and 176 and coil 177 of the gate control to $L_2$. This closes switches 178, 179 (three of the latter) and opens switch 180. Switch 178 through normally closed microswitch 181 completes a circuit from $L_1$ through coil 177 to $L_2$, thus locking in coil 177. Closing of switches 179 energizes the gate control motor 182 and operates it in a direction to raise all the gates.

Switch 174 is opened by motor 175 after forty-nine seconds, so that, when switch 181 again closes there will be no repeated operation of the gate motor. At the same time, switch 174' is closed. Now, when coil 170 is deenergized, as it is upon the selection of a new primary storage belt by switch 148, switch 173 closes, completing a circuit from $L_1$ through switches 173, 174' to motor 175 and operating the motor long enough to restore the parts to their starting position, with switch 174 closed, after which switch 174' opens and the motor stops.

When the gates reach their raised position, where they are caught and held by a catch, microswitch 181 is opened and microswitch 183 is closed. Opening of switch 181 breaks the holding circuit through coil 177, opening switches 178, 179, thus stopping motor 182, and closing switch 180. A circuit is now completed from $L_1$ through switches 183, 180 and coil 184 to $L_2$. This closes switches 185, 186 (three of the latter). Closing of switches 186 drives motor 182 in the opposite direction, so as to move the gate actuating member towards gate lowered position. However, as will be explained, there is a lost motion connection between the gates and the actuating member so that the gates remain up until their latches are released. The beginning of this movement of the gate actuating member opens microswitch 183. Switch 185 completes a circuit from $L_1$ through normally closed switch 187, switch 185 and coil 184 to $L_2$. This locks in coil 184, so that the motor continues to run until the gate actuating member reaches gate lowered position. Microswitch 187 is now opened, breaking the holding circuit through coil 184 and stopping motor 182.

The gates being now raised, switches 165a are open and switches 165b are closed. The bagger, who has charge of any pair of chutes from the secondary sorting belt, as soon as he has finished bagging all packages from the previous sort, pushes push button switch 188. Associated with the bag rack is an eight-position rotary switch, with two switches 189, 190 for each position. Normally, all switches 189 are closed and all switches 190 are open, except that in the position corresponding to the particular position of the rotary bag rack switch 189 is open and switch 190 closed. Assuming the bag rack to be in some other position than position 1, and position 1 to be selected on switch 148, switch 188 when closed completes a circuit from $L_1$ through switch 168, closed switch 189(1), and coil 191 to $L_2$. This raises the sack rack latch by emergizing solenoid 192 to release the rack for turning and closes switch 193, thus completing a circuit from $L_1$ through switches 168, 189(1), 194 and 193 and coil 195 to ground. Coil 195 closes switches 196, 197 (three of the latter). Switch 196 completes a circuit from $L_2$ through coil 191, switch 196, and coil 195 to ground, thus locking in both coils 191 and 195. Switches 197 energize bag rack motor 198, causing the rack to turn.

When the bag rack reaches its proper position, switch 189(1) opens and switch 190(1) closes. Opening of switch 189(1) breaks the circuit to coils 191, 195 stops motor 198 and allows the sack rack latch to drop to latching position. Closing of switch 190(1) and 165b(1) completes a circuit to solenoid 199(1) which releases the gate latch and allows the gate to drop. This allows any packages from the new sort which have already been distributed and which have accumulated behind the gate to drop down the chute to the bagger, and any other packages distributed during the run can also slide down the chute until the gates are raised for a new sort.

If the bag rack is already in position 1 (that is, if two successive sorts from the same primary storage belt are to be made), at the beginning of the operation switch 189(1) will be open and switch 190(1) will be closed. This means that closing of switch 168 will close a circuit from $L_1$ through switch 168, 190(1) and 165b(1) and coil 199 to $L_2$, so that the gate latch will be held in releasing position, so that it will merely be moved up by motor 182 and will move downward again as the motor 182 reverses. This makes no difference, since the proper bags are in position on the bag rack.

Coils 167, 170 remain energized until switch 148 is moved to a new position. If there is no change (that is, selection of a different primary storage belt), switch 173 will remain open so that closing of switch 174' will not actuate the motor 175. However, under these conditions there is no need to raise the gates, since no confusion of two sorts from different storage belts can take place.

The secondary sorting belt diverters are actuated like those of the main belt, except that their circuit contains no counting arrangement. As shown in FIG. 9, the memory device 200 for the secondary sorting belt (which can be identical with memory device 106) has output lines 91S+, 91S—, energizing coils 201, 202 to close switches 203, 204 or 205, 206 respectively. Switches 203, 205 drive motor 207 in one direction or the other. Switches 204, 206 are holding switches for causing the motor to operate for a full stroke, after which microswitches 208 are opened to stop the operation.

The main belts 2 run continuously, controlled by a start button 209 and a stop button 210 (FIG. 8). Its circuit includes a coil 211, a locking switch 212 and switches 213 for connecting motor 214 to the lines.

The switches marked OL are merely overload switches for safety purposes.

There is, of course, a main belt diverter control (120, etc. FIG. 7) for each two-way diverter along the main belt, all connected to memory device 106; long belt and short belt motor controls (133, etc. and 134, etc., FIG. 7), and a time delay relay (149, 156 etc., FIG. 7) for each primary storage belt connected to terminals 147(2), etc. There is likewise a diverter control as shown in FIG. 9 for each diverter of the secondary sorting belt connected to memory device 200. Also, as indicated in FIG. 10, there are index relays (167, etc.) connected to contacts 147'(2) etc., for each primary storage belt; and a gate latch and sack motor control for each chute means (specifically, a chute divided into two parts) of the secondary sorting belt. The successive right-hand terminals of switches 189(2), etc., are connected to switches 168(2), etc., of the index relays.

*Oversize Package Ejector, Horizontal Diverter and Diverter Centering*

The two-way diverters used in the system necessarily extend across the belt. In order to avoid excess height, these are constructed to give a clearance of two feet, which is enough for most packages. Some means must be provided for removing from the belt packages above this height, or packages so set on the main belts that their vertical dimension exceeds this height, before they reach the first two-day diverter.

For this purpose, the system shown in FIG. 1 employs an oversize package ejector 8, using a horizontal diverter. This system is shown in detail in FIGS. 13 to 15, the circuit being shown in FIG. 11.

As shown in FIG. 11, a light source 220 and electric eye 221 are arranged on opposite sides of belt 2, at a level two feet above the belt. The circuit connected with photocell 104 is arranged to center the operation of the diverter, that is, to cause the diverter to operate when the package is centered with respect to the pusher plate of the diverter. For this purpose, photocell 221 controls tube 223 so as to bias the tube when the cell is exposed, to remove the bias when the light source is shut off, and to restore the bias when the interruption ends.

Tube 223 controls a flip-flop circuit 224 which connects a source of constant voltage alternately to terminals 225, 225', across which is connected a resistance $R_3$, one end of which is connected through an equal resistance $R_3'$ to a condenser 226. This condenser is connected to a breakdown circuit 227 which, when the charge on condenser 226 reaches a predetermined value, triggers the operation of the horizontal diverter 8 through the circuit to be described below.

This circuit operates as follows, with reference to FIGS. 11 and 12.

As long as the light is not interrupted, no charge is imposed on condenser 226, and the flip-flop circuit holds a connection to terminal 225. If the light is cut off from the photocell, tube 223 initiates the charging of condenser 226 through both resistances R, $R_3'$. Now when the cell is again exposed, tube 223 operates the flip-flop circuit to make a connection to contact 225', thus charging the condenser at twice the previous rate. It will be clear, then, that the charge on condenser 226 will reach the threshold value at a time which depends both on the position of the package on the belt and on the length of the package. This is because, as shown in FIG. 12, for a package of length $l_1$ intersecting the light at $a$, the threshold will be reached at $b$, whereas the same package intersecting at $c$ will reach the threshold value at $d$. Likewise, a smaller package of lengths $l_2$, $l_3$ entering at $a$ will, at points $f$, $g$ reexpose the cell and initiate charging at twice the previous rate, reaching the threshold value at $h$, $i$, respectively.

The detector system is positioned ahead of the horizontal diverter, and the breakdown circuit 227 is provided with a delay system, so that the diverter will operate when the middle of the package is opposite the middle of the diverter plate.

The breakdown of circuit 227 closes line 228 at 229, thus connecting $L_1$ through 228, 229, relay coil 230 and normally closed switch 231 to ground. This closes switches 232 to energize the motor 233 and holding switch 234. The motor then runs for one full cycle of the diverter, after which microswitch 235 is opened (by the completion of the diverter cycle) and the coil 230 is deenergized, thus stopping the motor.

This centering system may also be used in connection with code-pulse-controlled two-way diverters, in which the coded tape merely presets the centering circuit of any particular diverter, which in turn triggers the diverter at the proper time. In this case, of course, the light and photocell are positioned just above the level of the belt.

The horizontal diverter (FIGS. 13 to 15) is composed of a frame 236 carrying a motor 237 which drives by belt 238 a flexible coupling 239 connected to shaft 240. Shaft 240 through belt 241 drives shaft 242. Carried by shafts 240 and 242 are arms 243, which at their free ends carry pivots 244 on which are mounted the legs 245 of a rigid three-sided frame, the third side of which is composed of the pusher plate 246.

As shown in FIG. 15, when the motor turns, the arms move in the direction of arrow $a$ while the belt is moving in the direction of arrow $b$. The arms and pusher plate then move to the positions shown in broken lines. Thus the pusher plate, driving the outer part of its path of movement, is travelling in the same direction as the belt, and at the same average speed. It is therefore prevented from striking either the preceding or the succeeding passage.

*Overhead Two-Way Diverter*

The overhead two-way diverter is shown in detail in FIGS. 16, 16A and 17. It includes a frame 250 suitably mounted above the belt 2 or 38. On the inside of each vertical end wall of the frame is a channel guide 251 opening inwardly. In this slide blocks 252, in which are journalled the ends of a carrier angle iron 253. Near each end of member 253 are secured to its web metal springs 254, these extending downwards towards the belt. The lower ends of the springs are slidably engaged in the paddle or diverting member 255. The central sections of the springs are reinforced by additional spring strips 256, clamped to springs 254 by clamps 257.

A bracket 258 is fixed to each of the spring members. A crank arm 259 is pivoted at 260 to this bracket. Crank 259 is driven through pulleys and belt 261 by motor 228 or 242. Bracket 258 carries on its outer side a tube or sleeve 263 in which is slidable a rod 264 the lower end of which is secured to the paddle 255. A coil spring 265 between the tube and the paddle constantly urges the paddle downwardly. At its upper end, rod 264 carries a roller 266 which engages a cam 267 on the inside of the end wall of the housing. This cam is so shaped that the lower edge of the paddle, a least during the greater part of its movement across the belt, moves in a horizontal plane spaced only slightly above the top of the belt so as to sweep even the smallest packages off the belt when the paddle is actuated.

Motor 228 (or 242) is controlled to turn in either direction by one of the control circuits shown in FIGS. 7 and 9. FIGS. 16 and 17 show the paddle in the lowered or diverting position. Of course, the paddle is normally in the raised position with crank 259 pointing upwardly. When the motor is energized, it drives the crank through a full turn, thus sweeping the paddle across the belt in one direction or the other. During this movement, the paddle 255 at first assumes its fully extended position under the influence of spring 265, as shown in broken lines in FIG. 1. However, as soon as roller 266 engages cam 267, it pulls rod 264 and the paddle upwardly against the action of springs 265, so that the lower end of the paddle moves in a straight line across the belt.

At the end of each full stroke, cams on the ends of the crank shaft momentarily open one of microswitches 127 (or 208) (FIGS. 7 and 9) so as to break the circuit to the motor and leave the paddle in its upward position ready for another operation.

Gate Actuating Mechanics

FIGS. 18 and 19 show the operating mechanism for gates 39 of chutes 42. Each chute has a gate 39 pivoted at 270 to swing between raised and lowered positions, the latter being shown in broken lines and blocking the chute. The gate is so balanced as to fall to its lower position by gravity when it is released. It has an arm 271 which is connected by cable 272 running over pulleys 273 to a pipe 274 slidable on a cable 275. The two gates of each pair of chutes are so connected to a single pipe. Cable 275 carries a stop 276 for each pair of gates, which can engage pipe 274 to pull it downward (FIG. 19) and thus raise the gates when the motor 182 is actuated in the proper direction.

Pipe 274 carries a ring 278 which is engageable by a latch 279 which is spring urged to latching position but which can be withdrawn by solenoid 199.

There is a similar assembly for each pair of chutes. Assuming the gates to be latched in raised position as shown, the bagger, when he closes push button 188 releases latches 279 and the tubes move upwards, the gates falling to lowered position and the tubes 274 engaging stops 276. Now, when the motor 182 is energized in gate raising direction, stops 276 will move pipes 274 downward until member 278 engages behind latch 279, thus locking the gates again in raised position.

Rotating Bag Holder

The rotating bag holder 44 is shown in FIGS. 20 to 22. It includes an outer rim 300 and inner rims 301 and 302 connected by radial ribs 323, forming a frame mounted on a vertical rotatable shaft 303 which can be driven by motor 304.

Bag Holder

Secured on the outside rim 300 of the rotating bag holder 44, as shown in FIG. 20, are a plurality of curved plates 305 arranged in pairs and provided along their lower edges with outwardly directed ribs 306. The inner rims 301 and 302 have guides 307 for rods 308 which carry at their outer ends plates 309 having outwardly curved ends. Coiled springs 310 are each connected at one end to parts 311 carried by the frame of the rotating holder, and at their other ends by cables 312 passing over pulleys 313 to rods 308.

Associated with rods 308 are latch devices 314 of the type commonly used in connection with automobile trunk lids. Such devices, when extended and then returned towards normal position, catch at a certain point in their return travel. When again extended, they allow return past the catch position. These actions take place alternately.

Now, assuming that a bag 315 is engaged over plates 305 and 309, it will be supported in open-mounted position by the tension of spring 310 pulling the plate 309 inwardly. Now if the bagger wishes to change a bag, he grasps the outer edge of the bag between plates 305 and pulls it towards him. This pulls plate 309 out beyond the catch position of latch device 314. Now, the bagger lets the plate move back to the catch position shown in dotted lines in FIG. 20. The plate 309 then remains in this position and the bag is readily removed.

An empty bag is now engaged with its upper edge over plate 309, and pulled towards the bagger far enough to release the latch device and then allowed to be pulled inward by springs 310 until it engages plates 305, when it is held in position for filling.

The holders need not support the weight of the bags, since these rest with their bottoms on a floor 316 carried by the rotating frame. Their purpose is primarily to hold open the mouth of the bag.

A stationary catch indicated at 317 in FIG. 20 and shown in detail in FIG. 22 is carried by a fixed part 318 and is engageable with the radial ribs 323 to hold the bag holding rack in proper position. This catch includes a lever 319 pivoted at 320 on the fixed part 318 and urged in clockwise direction by spring 321. It has a notch 322 engageable over rib 323, formed between a nose 324 having a camming surface 325 and a rubber bumper 326. A rod 327 controlled by solenoid 192 and pivoted to lever 319 lifts the latch when the solenoid is energized to permit rotation of the rack to a new position. When the rack approaches a position in which the solenoid has been released, it will engage cam surface 325 and lift lever 319 enough so that it can engage in notch 332.

We claim:

1. A system for sorting articles comprising substantially continuously acting means for preliminarily sorting articles having a number of different destinations into a plurality of groups each of which comprises articles directed to a selected group of different destinations, means to store the various groups of articles, a second sorting means, and means to feed the groups of stored articles one group at a time to the second sorting means.

2. A system for sorting articles comprising substantially continuously acting means for preliminarily sorting articles having a number of different destinations into a plurality of groups each of which comprises articles directed to a selected group of different destinations, a first means to store the various groups of articles, a second sorting means having a plurality of receiving stations each including second article storing means, said second sorting means including means to divert articles to the article storing means of each receiving station, a plurality of article receiving means associated with each receiving station and each intended to receive articles directed to a destination in one of said groups only, means to move said receiving means into position to receive articles from said second storing means, means to feed the groups of stored articles one group at a time to the second sorting means, means connected to said feeding means and said moving means to preset said moving means for movement of the receiving means to a position corresponding to the destination of any group in response to actuation of the feeding means of that group, and control means connected to said second storing means and said moving means to cause said moving means to move the receiving means to the preset position and thereafter to render said second storing means inoperative.

3. A system for sorting articles comprising substantially continuously acting means for preliminarily sorting articles having a number of different destinations into a plurality of groups each of which comprises articles directed to a selected group of different destinations, means to store the various groups of articles, a second sorting means having a plurality of receiving stations, a plurality of article receiving means associated with each receiving station and each intended to receive articles directed to a destination in one of said groups only, means to move said receiving means into position to receive articles from said second sorting means, said second sorting means including means to divert articles to the article receiving means of each receiving station, means to feed the groups of stored articles one group at a time to the second sorting means, means connected to said feeding means and said moving means to preset said moving means for movement of the receiving means to a position corresponding to the destination of any group in response to actuation of the feeding means of that group, and control means connected to said second moving means to cause said moving means to move the receiving means to the preset position.

4. A system for sorting articles comprising substantially continuously acting means for preliminarily sorting articles having a number of different destinations into a plurality of groups each of which comprises articles directed to a selected group of different destinations, means to store the various groups of articles, a second sorting means having a plurality of receiving stations, said second sorting means including means to divert articles to each receiving station, a plurality of article receiving means associated with each receiving station and each intended to receive articles directed to a destination in one of said groups only, said receiving means being movable into position to receive articles from said diverting means, and means operatively connected to said receiving means to prevent feeding of articles of a new group to said receiving means until said receiving means has moved to the position corresponding to such group.

5. A system for sorting articles comprising at least one main belt, means to drive said belt continuously, a plurality of primary storage belts, a plurality of first diverting means spaced along said main belt to divert articles carried thereon to said primary storage belts, control means to operate the first diverting means, transmitting means positioned to receive articles from said primary storage belts, a secondary sorting belt, said transmitting means conveying articles received from said primary storage belt to a position adjacent said secondary sorting belt, a plurality of second diverting means spaced along said secondary sorting belt, downwardly sloping chute means adjacent each of said second diverting means to receive articles diverted from said secondary sorting belt, a movable gate associated with each chute means for holding back articles therein, each chute means having an opening therein below said gate, a rotatable bag holder having means to hold at least as many bags as the number of primary storage belts whose mouth openings are substantially equal in size to said chute openings arranged below each said chute means to turn about a vertical axis to bring the openings of bags held thereby beneath the opening of said chute means, means to turn said bag holder, control means to operate the second diverting means, means to drive said primary storage belts continuously for limited periods of time, control means for selectively actuating the drive means for each of said primary storage belts, means responsive to actuation of said last control means to preset the moving means of each rotating bag holder, and means for each chute means for first operating said bag holder moving means to bring the bags carried thereby to the positions preset by said presetting means and thereafter to move the gates of such chute means to unblocking position.

6. A system for sorting articles comprising at least one main belt, means to drive said belt continously, a plurality of primary storage belts, a plurality of first diverting means spaced along said main belt to divert articles carried thereon to said primary storage belts, first recording tape memory means driven in synchronism with said main belt, a first manually operable means adjacent said first transfer means to impose on said first tape means code-distance signals at lengths differing from the beginning of each of a succession of space intervals on the first tape means in accordance with differences in the code imposed on said first manually operable means, first pickup means for each of said first diverting means adjacent the path of said first tape means for receiving such code-pulse signals, a plurality of first circuit means each connected with one of said first pickup means and one of said diverting means, first means synchronized with said first tape means to furnish to each of said first circuit means a gate signal when the beginning of each space interval of the first tape means passes said signal imposing means, the pickup means associated with the different first diverting means being each spaced a different distance from the position of the adjacent tape interval when the beginning of one interval is opposite the signal imposing means, said circuit means being responsive to the simultaneous receipt of said gate signal by the circuit and the passage of a code-distance signal past the pickup means thereof to operate the associated first diverting means, transmitting means positioned to receive articles from said primary storage belts, a substantially continuously driven secondary sorting belt, said transmitting means conveying articles received from said primary storage belt to a position adjacent said secondary sorting belt, a plurality of second diverting means spaced along said secondary sorting belt, downwardly sloping chute means adjacent each of said second diverting means to receive articles diverted from said secondary sorting belt, movable means associated with each chute means for holding back articles therein, each chute means having an opening therein below said hold-back means, a bag holder having means to hold at least as many bags as the number of primary storage belts whose mouth openings are substantially equal in size to said chute openings mounted below each said chute means for movement to bring the openings of bags held thereby beneath the opening of said chute means, means to move said bag holder, recording tape memory means driven in synchronism with said secondary sorting belt, a second manually operable means adjacent said second transfer means to impose on said second tape means code-distance signals at lengths differing from the beginning of each of a succession of space intervals on said second tape means in accordance with difference in the code imposed on said second manually operable means, second pickup means for each of said second diverting means adjacent the path of said second tape means for receiving such code pulse signals, a plurality of second circuit means each connected with one of said second pickup means and one of said second diverting means, second means synchronized with said second tape means to furnish to each of said second circuit means a gate signal when the beginning of each space interval of the second tape means passes said second pickup means, the pickup means associated with the different second diverting means being each spaced a different distance from the position of the adjacent tape interval when the beginning of one interval is opposite the signal imposing means, said circuit means being responsive to the simultaneous receipt of said gate signal by the circuit and the passage of a code-distance signal past the pickup means thereof to operate the associated second diverting means, means to drive said primary storage belts to move articles to said transmitting means, control means for selectively actuating the drive means for each of said primary storage belts, means responsive to actuation of said last control means to preset the moving means of each bag holder, and manually controlled means for each chute means for first operating said bag holder moving means to bring the bag carried thereby to the position preset by said presetting means and thereafter to set the holdback means of such chute means in inoperative position.

7. A system for sorting articles comprising at least one main belt, means to drive said belt continuously, a plurality of primary storage belts, a plurality of first diverting means spaced along said main belt to divert articles carried thereon to said primary storage belts, control means to operate the first diverting means, means responsive to a predetermined number of operations of each first diverting means to advance the primary storage belt fed by such operations a predetermined distance, transmitting means positioned to receive articles from said primary storage belts, a substantially continuously driven secondary sorting belt, said transmitting means conveying articles received from said primary storage belt to a position adjacent said secondary sorting belt, a plurality of second diverting means spaced along said secondary sorting belt, downwardly sloping chute means adjacent each of said second diverting means to receive articles diverted from said secondary sorting belt, a movable gate associated with each chute means for holding back articles therein, each chute means having an opening therein below said gate, a rotatable bag holder having means to hold at least as many bags as the number of primary storage belts whose mouth openings are substantially equal in size to said chute openings arranged below each said chute means to turn about a vertical axis to bring the openings of a bag held thereby beneath the opening of said chute means, means to turn said bag holder, control means to operate the second diverting means, means to drive said primary storage belts continuously for limited periods of time, control means for selectively actuating the drive means for each of said primary storage belts, means responsive to actuation of said last control means to preset the moving means of each rotating bag holder, and means for each chute means for first operating said bag holder moving means to bring the bag carried thereby to the position preset by said presetting means thereafter to move the gate of such chute means to unblocking position.

8. A system for sorting articles comprising at least one main belt, means to drive said belt continuously, a plurality of primary storage belts, a plurality of first diverting means spaced along said main belt to divert articles carried thereon to said primary storage belts, control means to operate the first diverting means, means responsive to a predetermined number of operations of each first diverting means in one direction to advance the primary storage belt fed by such operations a predetermined distance, transmitting means positions to receive articles from said primary storage belts, a substantially continuously driven secondary sorting belt, said transmitting means conveying articles received from said primary storage belt to a position adjacent said secondary sorting belt, a plurality of second diverting means spaced in adjacent pairs along said secondary sorting belt, downwardly sloping chute means adjacent each of said second diverting means, means dividing each such chute means into sections for receiving articles from the two diverters of each pair, a movable gate associated with each chute means for holding back articles therein, each chute section having an opening therein below said gate, a rotatable bag holder having means to hold at least as many bags as the number of primary storage belts whose mouth openings are substantially equal in size to said chute openings arranged below each said chute means to turn about a vertical axis to bring the openings of bags held thereby simultaneously beneath the openings of said chute means, means to turn said bag holder, control means to operate the associated second diverting means, means to drive said primary storage belts continuously for limited periods of time, control means for selectively actuating the drive means for each of said primary storage belts, means responsive to actuation of said last control means to preset the moving means of each rotating bag holder, and manually controlled means for each chute means for first operating said bag holder moving means to bring the bags carried thereby to the positions preset by said presetting means and thereafter to move the gates of said chute means to unblocking position.

9. A system for sorting articles comprising at least one main belt, means to drive said belt continuously, a plurality of primary storage belts, a plurality of first diverting means spaced along said main belt to divert articles carried thereon to said primary storage belts, control means to operate the first diverting means, each first diverting means being operable to divert articles to either side of the main belt, means to conduct articles from each side of the main belt adjacent each first diverting means to a different primary storage belt, means responsive to a predetermined number of operations of each first diverting means in one direction to advance the primary storage belt fed by such operations a predetermined distance, transmitting means positioned to receive articles from said primary storage belts, a substantially continuously driven secondary sorting belt, said transmitting means conveying articles received from said primary storage belt to a position adjacent said secondary sorting belt, a plurality of second diverting means spaced in adjacent pairs along said secondary sorting belt, each said second diverting means being operable to divert articles to either side of the secondary sorting belt, downwardly sloping chute means adjacent each pair of said second diverting means on each side of said secondary sorting belt to receive articles diverted therefrom, means dividing each such chute means into sections for receiving articles from the two diverters of each pair, a movable gate associated with each chute means for holding back articles therein, each chute section having an opening therein below said gate, a rotatable bag holder having means to hold twice as many bags as the number of primary storing belts whose mouth openings are substantially equal in size to said chute openings arranged below each said chute means to turn about a vertical axis to bring the openings of two bags held thereby simultaneously beneath the two openings of said chute means, means to turn said bag holder, control means to operate the second diverting means, means to drive said primary storage belts continuously for limited periods of time, control means for selectively actuating the drive means for each of said primary storage belts, means responsive to actuation of said last control means to preset the moving means of each rotating bag holder, and manually controlled means for each chute means for first operating said bag holder moving means to bring the bags carried thereby to the positions preset by said presetting means and thereafter to move the gates of such chute means to unblocking position.

10. A system for sorting articles comprising at least one main belt, means to drive said belt continuously, a plurality of primary storage belts, a plurality of first diverting means spaced along said main belt to divert articles carried thereon to said primary storage belts, first memory means operated in synchronism with said main belt, a first manually operable means adjacent said first transfer means to impose signals on said first memory means, means associated with each of said first diverting means for receiving such signals, a plurality of first circuit means each connected with one of said first signal receiving means and one of said diverting means, the circuits connected to the different first diverting means being each responsive to a different signal to operate the associated first diverting means, each first diverting means being operable to divert articles to either side of the main belt, means to conduct articles from each side of the main belt adjacent each first diverting means to a different primary storage belt, means responsive to a predetermined number of operations of each first diverting means in one direction to advance the primary storage belt fed by such operations a predetermined distance, transmitting means positioned to receive articles from said primary storage belts, a substantially continuously driven secondary sorting belt, said transmitting means conveying articles received from said primary storage belt to a position adjacent said secondary sorting belt, a plurality of second diverting means spaced in adjacent pairs along said secondary sorting belt, each said second diverting means being operable to divert articles to either side of the secondary sorting belt, downwardly sloping chute means adjacent each pair of said second diverting means on each side of said secondary sorting belt to receive articles diverted therefrom, means dividing each such chute means into sections for receiving articles from the two diverters of each pair, a movable gate associated with each chute means for holding back articles therein, each chute section having an opening therein below said gate, a rotatable bag holder having means to hold twice as many bags as the number of primary sorting belts whose mouth openings are substantially equal in size to said chute openings arranged below each said chute means to turn about a vertical axis to bring the openings of two bags held thereby simultaneously beneath the two openings of said chute means, means to turn said bag holder, a second memory means driven in synchronism with said secondary sorting belt, a second manually operable means adjacent said second transfer means to impose signals on said second memory means, second means for each of said second diverting means for receiving such signals, a plurality of second circuit means each connected with one of said second signal receiving means and one of said second diverting means, the circuits connected to the different second diverting means being each responsive to a different signal to operate the associated second diverting means, means to drive said primary storage belts continuously for limited periods of time, control means for selectively actuating the drive means for each of said primary storage belts, means responsive to actuation of said last control means to preset the moving means of each rotating bag holder, and manually controlled means for each chute means for first operating said bag holder moving means to bring the bags carried thereby to the positions preset by said presetting means and thereafter to move the gates of such chute means to unblocking position.

11. A system for sorting articles comprising at least one main belt, means to drive said belt continuously, first means to transfer articles to said belt at spaced intervals, a plurality of primary storage belts, a plurality of first diverting means spaced along said main belt to divert articles carried thereon to said primary storage belts, first recording tape memory means driven in synchronism with said main belt, a first manually operable means adjacent said first transfer means to impose on said first tape means code-distance signals at lengths differing from the beginning of each of a succession of space intervals on the first tape means in accordance with differences in the code imposed on said first manually operable means, first pickup means for each of said first diverting means adjacent the path of said first tape means for receiving such code-distance signals, a plurality of first circuit means each connected with one of said first pickup means and one of said diverting means, the circuits connected to the different first diverting means being each responsive to a different time difference between the beginning of the passage of an interval past the pickup means and the passage of a code-distance signal past the pickup means to operate the associated first diverting means, means responsive to a predetermined number of operations of each first diverting means in one direction to advance the primary storage belt fed by such operations a predetermined distance, transmitting belt means positioned to receive articles from said primary storage belts, a substantially continuously driven secondary sorting belt, second means to transfer articles to said secondary sorting belt, said transmitting means conveying articles received from said primary storage belt to a position adjacent said secondary transfer means, a plurality of second diverting means spaced along said secondary sorting belt, each said second diverting means being operable to divert articles to either side of the secondary sorting belt, downwardly sloping chute means adjacent each of said second diverting means on each side of said secondary sorting belt to receive articles diverted therefrom, a movable gate associated with each chute means for holding back articles therein, each chute means having an opening therein below said gate, a rotatable bag holder having means to hold at least as many bags as the number of primary storing belts whose mouth openings are substantially equal in size to said chute openings arranged below each said chute means to turn about a vertical axis to bring the openings of a bag held thereby beneath the opening of said chute means, means to turn said bag holder, a second recording tape memory means driven in synchronism with said secondary sorting belt, a second manually operable means adjacent said second transfer means to impose on said second tape means code-distance signals at lengths differing from the beginning of each of a succession of space intervals on said second tape means in accordance with differences in the code imposed on said second manually operable means, second pickup means for each of said second diverting means adjacent the path of said second tape means for receiving such code-distance signals, a plurality of second circuit means each connected with one of said second pickup means and one of said second diverting means, the circuits connected to the different second diverting means being each responsive to a different time difference between the beginning of the passage of an interval past the pickup means and the passage of a code-distance signal past the pickup means to operate the associated second diverting means, means to drive said primary storage belts continuously for limited periods of time, control means for selectively actuating the drive means for each of said primary storage belts, means responsive to actuation of said last control means to preset the moving means of each rotating bag holder, and manually controlled means for each chute means for first operating said bag holder moving means to bring the bag carried thereby to the positions preset by said presetting means and thereafter to move the gates of such chute means to unblocking position.

12. A system for sorting articles comprising at least one main belt, means to drive said belt continuously, first means to transfer articles to said belt at spaced intervals, a plurality of primary storage belts running transversely to said main belt, a plurality of first diverting means spaced along said main belt to divert articles carried thereon to said primary storage belts, first recording tape memory means driven in synchronism with said main belt, a first manually operable means adjacent said first transfer means to impose on said first tape means code-distance signals at lengths differing from the beginning of each of a succession of space intervals on the first tape means in accordance with differences in the code imposed on said first manually operable means, first pickup means for each of said first diverting means adjacent the path of said first tape means for receiving such code-distance signals, a plurality of first circuit means each connected with one of said first pickup means and one of said diverting means, first means synchronized with said first tape means to furnish to each of said first circuit means a gate signal when the beginning of each space interval of the first tape means passes said first signal imposing means, the pickup means associated with the different first diverting means being each spaced a different distance from the position of the adjacent tape interval when the beginning of an interval is opposite the signal imposing means, said circuit means being responsive to the simultaneous receipt of said gate signal by the circuit and the passage of a code-distance signal past the pickup means thereof to operate the associated first diverting means, each first diverting means being operable to divert articles to either side of the main belt, means to conduct articles from each side of the main belt adjacent each first diverting means to a different primary storage belt, means responsive to a predetermined number of operations of each first diverting means in one direction to advance the primary storage belt fed by such operations a predetermined distance, transmitting belt means positioned to receive articles from said primary storage belts, a substantially continuously driven secondary sorting belt, second means to transfer articles to said secondary sorting belt, said transmitting means conveying articles received from said primary storage belt to a position adjacent said second transfer means, a plurality of second diverting means spaced in adjacent pairs along said secondary sorting belt, each said second diverting means being operable to divert articles to either side of the secondary sorting belt, downwardly sloping chute means adjacent each pair of said second diverting means on each side of said secondary sorting belt to receive articles diverted therefrom, means dividing each such chute means into sections for receiving articles from the two diverters of each pair, a movable gate associated with each chute means for holding back articles therein, each chute section having an opening therein below said gate, a rotatable bag holder having means to hold twice as many bags as the number of primary storage belts whose mouth openings are substantially equal in size to said chute openings arranged below each said chute means to turn about a vertical axis to bring the openings of two bags held thereby simultaneously beneath the two openings of said chute means, means to turn said bag holder, a second recording tape memory means driven in synchronism with said secondary sorting belt, a second manually operable means adjacent said second transfer means to impose on said second tape means code-distance signals at lengths differing from the beginning of each of a succession of space intervals on said second tape means in accordance with difference in the code imposed on said second manually operable means, second pickup means for each of said second diverting means adjacent the path of said second tape means for receiving such code-distance signals, a plurality of second circuit means each connected with one of said second pickup means and one of said second diverting means, second means synchronized with said second tape means to furnish to each of said second circuit means a gate signal when the beginning of each space interval of the second tape means passes said second signal imposing means, the pickup means associated with the different second diverting means being each spaced a different distance from the position of the adjacent tape interval when the beginning of one interval is opposite the signal imposing means, said circuit means being responsive to the simultaneous receipt of said gate signal by the circuit and the passage of a code-distance signal past the pickup means thereof to operate the associated second diverting means, means to drive said primary storage belts continuously for limited periods of time, control means for selectively actuating the drive means for each of said primary storage belts, means responsive to actuation of said last control means to preset the moving means of each rotating bag holder, and manually controlled means for each chute means for first operating said bag holder moving means to bring the bags carried thereby to the positions preset by said presetting means and thereafter to move the gates of such chute means to unblocking position.

13. In a system for sorting articles divided into a plurality of groups each of which comprises articles directed to a selected group of different destinations, a sorting means having a plurality of receiving stations, said sorting means including means to divert articles to each receiving station, a plurality of article receiving means associated with each receiving station and each intended to receive articles directed to a destination in one of said groups only, said receiving means being movable into position to receive articles from said diverting means, and means operatively connected to said receiving means to prevent feeding of articles of a new group to said receiving means until said receiving means has moved to the position corresponding to such group.

14. In a system for sorting articles divided into a plurality of groups each of which comprises articles directed to a selected group of destinations, a sorting belt, a plurality of diverting means spaced along said sorting belt, downwardly sloping chute means adjacent each of said diverting means to receive articles diverted from said sorting belt, a movable gate associated with each chute means for holding back articles therein, each chute means having an opening therein below said gate, a rotatable bag holder having means to hold at least as many bags as the number of groups whose mouth openings are substantially equal in size to said chute openings arranged below each said chute means to turn about a vertical axis to bring the openings of a bag held thereby beneath the opening of said chute means, means to turn said bag holder, control means to operate the diverting means, control means for selecting the bags allocated to a particular group, and manually controlled means for each chute means for first operating said bag holder moving means to bring the bags carried thereby to the positions preset by said selecting means and thereafter to move the gates of such chute means to unblocking position.

15. A system for sorting articles comprising at least one belt, a plurality of diverting means spaced along said belt to divert articles therefrom, recording tape memory means driven in synchronism with said belt, manually operable means to impose on said tape means code-distance signals at lengths differing from the beginning of each of a succession of space intervals on the tape means in accordance with differences in the code imposed on said manually operable means, pickup means for each of said diverting means adjacent the path of said tape means for receiving such code-distance signals, a plurality of circuit means each connected with one of said pickup means and one of said diverting means, means synchronized with said tape means to furnish to each of said circuit means a gate signal when the beginning of each space interval of the tape means passes said signal imposing means, the pickup means associated with the different diverting means being each spaced a different distance from the position of the adjacent tape interval when the beginning of one interval is opposite the signal imposing means, said circuit means being responsive to the simultaneous receipt of said gate signal by the circuit and the passage of a code-distance signal past the pickup means thereof to operate the associated diverting means.

16. In combination with a conveyor having a horizontal flat surface upon which articles move past a given point, means adjacent such point to remove articles from the conveyor in either direction comprising a frame extending above and across the conveyor, a paddle member, means mounting said paddle member on said frame for raising and lowering movement and for swinging movement, means to produce such movements of the paddle member, and cam means carried by the frame and operatively connected with the paddle member during the lower part of the movement thereof, and being shaped to cause the lower edge of the paddle member to move substantially in a horizontal plane during the lower part of its movement.

17. In combination with a conveyor having a horizontal flat surface upon which articles move past a given point, means adjacent such point for removing articles from the conveyor comprising a frame extending across and above the conveyor at such point, a paddle member provided with a vertical plane surface located in a plane parallel to the direction of movement of articles on the conveyor, means mounting said paddle member on said frame for movement substantially in an arc from a raised inoperative position above the conveyor to swing across the conveyor adjacent the surface thereof in either direction so as to divert articles from the conveyor to either side thereof, and means to drive the mounting means in either direction.

18. In a device as claimed in claim 17, means to guide the paddle member in the lower part of its movement so that its lower edge moves substantially in a horizontal plane adjacent the conveyor surface.

19. In combination with a conveyor having a horizontal flat surface upon which articles move past a given point, means adjacent such point for removing articles from the conveyor comprising a frame extending across and above the conveyor at such point, a paddle member provided with a vertical plane surface located in a plane parallel to the direction of movement of articles on the conveyor, means mounting said paddle member on said frame for movement substantially in an arc from a raised inoperative position above the conveyor to swing across the conveyor adjacent the surface thereof, means to drive the mounting means, and means to guide the paddle in the lower part of its arcuate movement so that its lower edge moves substantially in a horizontal plane adjacent the conveyor surface.

20. In combination with a conveyor having a horizontal flat surface upon which articles move past a given point, means adjacent such point to remove articles from the conveyor in either direction comprising a frame extending above and across the conveyor, a pair of spaced arms, means mounting said arms on said frame for raising and lowering movement and for swinging movement, a paddle carried by arms, means to produce such movements of the arms, spring means carried by said arms engaging the paddle member and urging it downwardly and cam means carried by the frame and operatively connected with the paddle member during the lower part of the movement of the arms, and being shaped to cause the lower edge of the paddle member to move substantially in a horizontal plane during the lower part of the movement of the arms.

21. In combination with a conveyor having a horizontal flat surface upon which articles move past a given point, means adjacent such point to remove articles from the conveyor in either direction comprising a frame extending above and across the conveyor, a pair of spaced arms, means mounting said arms on said frame for raising and lowering movement and for swinging movement, a paddle member, means to produce such movements of the arms, rods mounted on said arms and slidable longitudinally of the arms having their lower ends connected to the paddle member, spring means carried by the arms engaging the paddle member for urging it downwardly, and cam means on said frame in a position to be engaged by said rods during the lower part of the movement of the arms, said cam means being shaped to cause the lower edge of the paddle member to move substantially in a horizontal plane during the lower part of the movement of the arms.

22. In combination with a conveyor having a horizontal flat surface upon which articles move past a given point, means adjacent such point to remove articles from the conveyor in either direction comprising a frame extending above and across the conveyor, a pair of spaced arms, means mounting said arms on said frame for raising and lowering movement and for swinging movement, a paddle member, means to produce such movements of the arms, rods mounted on said arms and slidable longitudinally of the arms having their lower ends connected to the paddle member, spring means carried by the arms engaging the paddle member for urging it downwardly, an outwardly directed horizontal extension on the upper end of each rod, a roller journalled on each of said extensions, and cam members mounted on the inside of the frame on each side thereof in positions to be engaged by said rollers during the lower part of the movement of the arms, said cam members each having a raised central section and lower sections outside the central section and being shaped to cause the lower edge of the paddle member to move substantially in a horizontal plane during the lower part of the movement of the arms.

23. In combination with a conveyor having a horizontal flat surface upon which articles move past a given point, means adjacent such point to remove articles from the conveyor in either direction comprising a frame extending above and across the conveyor, a pair of spaced arms, means mounting said arms on said frame for raising and lowering movement and for swinging movement, a paddle member, means to produce such movements of the arms, tubes one carried by each arm above and spaced from the paddle member and extending longitudinally of the arms, rods one slidable in each of the tubes having their lower ends connected to the paddle member, compression coil springs around the rods between and engaging the paddle member and the tube, an outwardly directed horizontal extension on the upper end of each rod, a roller journalled on each of said extensions, and cam members mounted on the inside of the frame on each side thereof in positions to be engaged by said rollers during the lower part of the movement of the arms, said cam members each having a raised central section and lower sections outside the center section and being shaped to cause the lower edge of the paddle member to move substantially in a horizontal plane during the lower part of the movement of the arms.

24. In combination with a conveyor having a horizontal flat surface upon which articles move past a given point, means adjacent such point to remove articles from the conveyor in either direction comprising a frame extending above and across the conveyor, two vertical guide channels carried by said frame in common planes parallelling the direction of travel of articles on the conveyor, facing inwardly towards each other and located substantially at the longitudinal central vertical plane of the conveyor, a part guided and journalled in said guide channels and extending across the space between said channels, a pair of spaced arms carried by said part and extending downwardly therefrom, a paddle member, means for imparting raising and lowering movements and swinging movement to said arms, tubes one carried by each arm above and spaced from the paddle member and extending longitudinally of the arms, rods one slidable in each of the tubes having their lower ends connected to the paddle member, compression coil springs around the rods between and engaging the paddle member and the tube, an outwardly directed horizontal extension on the upper end of each rod, a roller journalled on each of said extensions, and cam members mounted on the inside of the frame on each side thereof in positions to be engaged by said rollers during the lower part of the movement of the arms, said cam members each having a raised center section and lower sections outside the center section and being shaped to cause the lower edge of the paddle member to move substantially in a horizontal plane during the lower part of the movement of the arms.

25. In combination with a driven belt conveyor having a horizontal flat surface upon which articles move past a given point, means adjacent such point to remove articles from the conveyor in either direction comprising a frame extending above and across the belt, two vertical guide channels carried by said frame spaced longitudinally of the belt, facing inwardly towards each other and located substantially at the longitudinal central vertical plane of the belt, blocks guided in said channels, a part journalled in said blocks and extending across the space between said channels, a pair of spaced spring arms carried by said part, and extending downwardly therefrom, a paddle member, brackets fixed one on each of said arms, cranks journalled in said frame and pivotally connected to said brackets, means to rotate said cranks in either direction, tubes one carried by each bracket above and spaced from the paddle member and extending longitudinally of the arms, rods one slidable in each of the tubes having their lower ends connected to the paddle member, compression coil springs around the rods between and engaging the paddle member and the tube, an outwardly directed horizontal extension on the upper end of each rod, a roller journalled on each of said extensions, and a cam member mounted on the inside of the frame on each side thereof in a position to be engaged by said rollers during the lower part of the movement of the arms, said cam having a raised central section and lower sections outside the center section and being shaped to cause the lower edge of the paddle member to move substantially in a horizontal plane during the lower part of the movement of the arms.

26. In combination with a conveyor having a horizontal flat surface upon which articles move past a given point, means adjacent such point for removing articles from the conveyor comprising a base, a pair of arms pivoted on said base above the level of said surface to turn about spaced vertical axes located in a common plane parallel to the direction of movement of articles carried by the conveyor, a frame pivoted on said arms at equal distances from said axes, said frame having a part provided with a vertical plane surface parallel to the plane of the axes, and means to rotate said arms so as to cause said frame to gyrate and to remove articles from the conveyor, the arms turning in such a direction that the frame moves during that half of its movement in which it overlies the conveyor in the direction of movement of articles on the conveyor.

27. In combination with a travelling belt conveyor having a horizontal flat surface upon which articles move past a given point, means adjacent such point for removing articles from the conveyor comprising a base, a pair of arms pivoted on said base above the level of said surface to turn about spaced vertical axes located in a common plane parallel to the direction of movement of the belt, a frame pivoted on said arms at equal distances from said axes, said frame having a part provided with a vertical plane surface parallel to the plane of the axes, and means to rotate said arms so as to cause said frame to gyrate and to remove articles from the conveyor, the arms turning in such a direction that the frame moves during that half of its movement in which it overlies the conveyor in the direction of movement of the belt.

28. In combination with a conveyor having a horizontal flat surface which articles move past a given point, means adjacent such point for removing articles from the conveyor comprising a frame having a part provided with a vertical plane surface located in a plane parallel to the direction of movement of articles on the conveyor, and means mounting said frame to gyrate and to remove articles from the conveyor, said means operating to move the frame during that half of its movement in which it overlies the conveyor in the direction of movement of articles on the conveyor.

29. A system for sorting articles comprising at least one main belt, means to drive said belt continuously, a plurality of primary storage belts, a plurality of first diverting means spaced along said main belt to divert articles carried thereon to said primary storage belts, control means to operate the first diverting means, transmitting means positioned to receive articles from said primary storage belts, a secondary sorting belt, said transmitting means conveying articles received from said primary storage belt to a position adjacent said secondary sorting belt, a plurality of second diverting means spaced along said secondary sorting belt, means adjacent each of said second diverting means to receive articles diverted from said secondary sorting belt, a rotatable bag holder adjacent each second diverting means having means to hold at least as many bags as the number of primary storage belts to turn about a vertical axis to bring the opening of a bag held thereby into position to receive articles from the second diverting means, means to turn said bag holder, control means to operate the second diverting means, means to drive said primary storage belts continuously for limited periods of time, control means for selectively actuating the drive means for each of said primary storage belts, means responsive to actuation of said last control means to preset the moving means of each rotating bag holder, and manually controlled means for each chute means for operating said bag holder moving means to bring the bags carried thereby to the positions preset by said presetting means.

30. In a system as claimed in claim 29, said diverting means comprising a frame extending above and across the conveyor, a paddle member, means mounting said paddle member on said frame for raising and lowering movement and for swinging movement, means to produce such movements of the paddle member, cam means carried by the frame and operatively connected with the paddle member during the lower part of the movement thereof, and being shaped to cause the lower edge of the paddle member to move substantially in a horizontal plane during the lower part of its movement.

31. In a system as claimed in claim 29, a second means adjacent said main belt in advance of the first diverting means for detecting and diverting articles of a height than the space between the main belt and the frame.

32. In a system as claimed in claim 31, second diverting means comprising a frame having a part provided with a vertical plane surface located in a plane parallel to the direction of movement of the belt, and means mounting said frame to gyrate and to remove articles from the belt, said means operating to move the frame during that half of its direction in which it overlies the conveyor in the direction of movement of the belt.

33. In a system as claimed in claim 32, means responsive to the passage of the beginning and end of an article past a point adjacent said last diverting means for operating the same at such a time that the center of said plane surface strikes the center of the article.

34. In a system as claimed in claim 14, said rotatable bag holder having bag receiving means comprising a frame, first and second members adapted to be engaged inside the opposite sides of the mouth of a bag, the first member being fixedly carried by the frame for movement towards and from the first member, spring means urging the second member away from the first member, and locking means operatively connected to said mounting means, said locking means on one stroke of the mounting means toward the first member catching the mounting means so that upon release thereof the second member is held closer to the first member than the width of the sack mouth and upon the next stroke releasing the catch so that the second member can move further away from the first member.

35. Bag receiving means comprising a frame, first and second members adapted to be engaged inside the opposite sides of the mouth of a bag, the first member being fixedly carried by the frame, means mounting the second member on the frame for movement towards and from the first member, spring means urging the second member away from the first member, and locking means operatively connected to said mounting means, said locking means on one stroke of the mounting means towards the first member catching the mounting means so that upon release thereof the second member is held closer to the first member than the width of the sack mouth and upon the next stroke releasing the catch so that the second member can move further away from the first member.

36. A system for sorting articles comprising a first movable belt means on which the articles are placed, coding means for coding the articles in operating relation to said belt means, a plurality of article diverter means located at different places along the belt means, code reading means in operating relation to articles on the belt means, said diverter means being operated by said code reading means to divert articles from the belt means in correspondence with the code of the article; and means comprising a second movable belt means for receiving the diverted articles.

37. A system according to claim 36 in which the means for receiving the diverted articles comprises a coding means in operating relation to articles moved by said second belt means and means responsive to said second coding means for diverting articles from said second belt means at selected positions.

References Cited in the file of this patent

UNITED STATES PATENTS

| | | |
|---|---|---|
| 1,256,294 | Campbell | Feb. 12, 1918 |
| 1,872,258 | Elberly | Aug. 16, 1932 |
| 2,728,466 | Postlewaite | Dec. 27, 1955 |
| 2,825,476 | Muller | Mar. 4, 1958 |